US011881123B2

(12) United States Patent
Stroup

(10) Patent No.: US 11,881,123 B2
(45) Date of Patent: *Jan. 23, 2024

(54) SYSTEM AND METHOD FOR GENERATIVE ASSESSMENT ITEM DEVELOPMENT, ENCODING AND ANALYSIS

(71) Applicant: GENED CORP., Austin, TX (US)

(72) Inventor: Walter Stroup, Austin, TX (US)

(73) Assignee: Gened Corp., Austin, TX (US)

( * ) Notice: Subject to any disclaimer, the term of this patent is extended or adjusted under 35 U.S.C. 154(b) by 454 days.

This patent is subject to a terminal disclaimer.

(21) Appl. No.: 17/255,530

(22) PCT Filed: Jun. 26, 2019

(86) PCT No.: PCT/US2019/039310
§ 371 (c)(1),
(2) Date: Dec. 23, 2020

(87) PCT Pub. No.: WO2020/006121
PCT Pub. Date: Jan. 2, 2020

(65) Prior Publication Data
US 2021/0375152 A1 Dec. 2, 2021

Related U.S. Application Data

(60) Provisional application No. 62/690,632, filed on Jun. 27, 2018.

(51) Int. Cl.
*G09B 7/06* (2006.01)

(52) U.S. Cl.
CPC ..................... *G09B 7/06* (2013.01)

(58) Field of Classification Search
CPC ... G09B 7/06; G09B 5/10; G09B 7/02; G09B 7/073; G09B 7/077; G09B 7/10; G06Q 50/20
USPC .......................................................... 434/362
See application file for complete search history.

(56) References Cited

U.S. PATENT DOCUMENTS

| 2005/0255439 | A1* | 11/2005 | Cody ....................... | G09B 7/06 434/353 |
| 2006/0078863 | A1 | 4/2006 | Coleman et al. | |
| 2006/0194182 | A1 | 8/2006 | Anand | |
| 2010/0159433 | A1* | 6/2010 | Graham ................... | G09B 7/00 434/362 |
| 2015/0064683 | A1* | 3/2015 | Rajagopalan ............ | G09B 7/02 434/359 |

(Continued)

OTHER PUBLICATIONS

IMS Global Learning Consortium Inc. Response Processing Templates (Nov. 27, 2017), available at http://www.imsglobal.org/question/qti_v2p2/rptemplates/match_correct.

(Continued)

*Primary Examiner* — Jay Trent Liddle
*Assistant Examiner* — Alyssa N Brandley
(74) *Attorney, Agent, or Firm* — Terrile, Cannatti & Chambers, LLP; Michael Rocco Cannatti

(57) ABSTRACT

Disclosed herein are system and method for generative assessment item development, encoding & analysis, wherein the generative assessment item includes a question and a plurality of possible responses to the question, the plurality of possible responses comprising at least two responses that are not independent, and wherein the plurality of responses are non-dichotomous.

20 Claims, 52 Drawing Sheets

(56) References Cited

U.S. PATENT DOCUMENTS

2015/0170536 A1\* 6/2015 Lan ..................... G06N 20/00
434/350
2017/0177565 A1 6/2017 Beason et al.

OTHER PUBLICATIONS

PCT/US2019/039310 International Search Report and Written Opinion dated Oct. 24, 2019.

\* cited by examiner

Fig. 3
*This question may have more than one correct answer. Select all correct responses.*
1. A group of friends is making cards for a fraction game. The cards need to show equivalent shaded fractions. They start with this card.
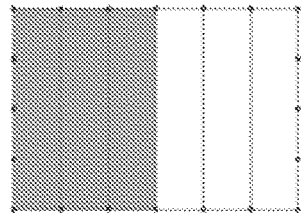
Which of these cards shows a shaded fraction that is equivalent to this card?
A     C 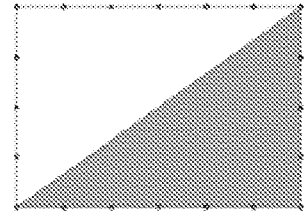
B 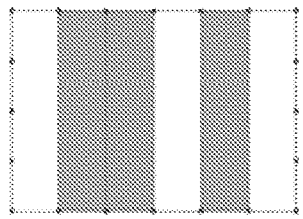    D 

Fig. 4

*This question may have more than one correct answer. Select all correct responses.*

2.

There are a total of 36 bicycles in rows. There are the same number of bicycles in each row. Which equation can be used to find the number of bicycles in each row?

*This question may have more than one correct answer. Select all correct responses.*

3.

David's class is working on a project comparing amounts of food. These comparisons are made. Which of these could be correct?

A Gallons of milk are compared to quarts of milk

B Pounds of flour are compared to fluid ounces of milk

C Pounds of flour are compared to pounds of cheese

D Fluid ounces of juice are compared to fluid ounces of juice

Fig. 6

*This question may have more than one correct answer. Select all correct responses.*

4.

This addition problem is missing two numbers. Which numbers placed in the boxes below would make the addition correct?

$$\begin{array}{r} 7\,\square\,2 \\ +\ 1\,\square\,3 \\ \hline 9\ \ 4\ \ 5 \end{array}$$

A  3 and 1

B  9 and 5

C  0 and 4

D  6 and 6

Fig. 7

*This question may have more than one correct answer. Select all correct responses.*

5.

Two friends ate lunch together.

Felicia ate $\frac{1}{3}$ of her sandwich.   Daria ate $\frac{1}{4}$ of her pie.

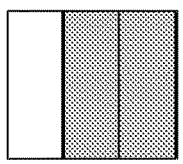 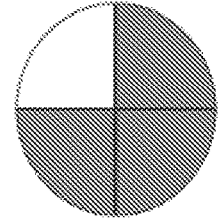

Which of these statements must be true?

A Felicia ate a greater part of her sandwich than Daria ate of her pie because $\frac{1}{3} > \frac{1}{4}$

B Felicia ate more food than Daria ate

C $\frac{2}{3}$ of the sandwich was not eaten by Felicia

D $\frac{3}{3}$ of the pie was not eaten by Daria

Fig. 8
*This question may have more than one correct answer. Select all correct responses.*
1. A group of friends is making cards for a fraction game. The cards need to show equivalent shaded fractions. They start with this card.
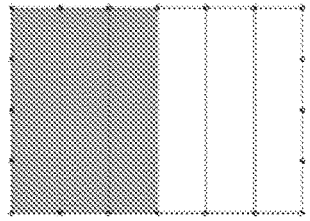
Which of these cards shows a shaded fraction that is equivalent to this card?
A 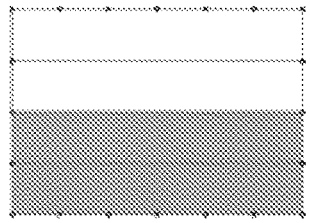    C 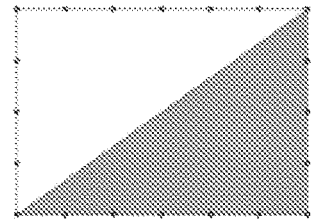
B 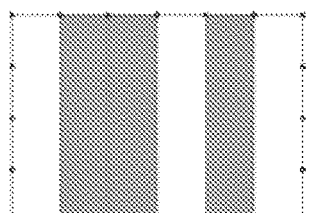    D 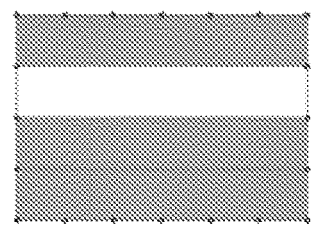

Fig. 9

*This question may have more than one correct answer. Select all correct responses.*

2. Which of these comparisons is true?

A $\quad \dfrac{3}{6} < \dfrac{3}{7}$

B $\quad \dfrac{1}{5} < \dfrac{2}{10}$

C $\quad \dfrac{2}{5} < \dfrac{3}{5}$

D $\quad \dfrac{3}{7} < \dfrac{4}{5}$

Fig. 10

*This question may have more than one correct answer. Select all correct responses.*

3.

Mike has 42 baseball cards. Maria starts with twice as many cards as Mike. Maria then gives away 6 cards. Which equation can be used to find $y$, the number of baseball cards Maria has now?

A  $42 - 6 + 42 = y$

B  $2 \times 42 + 6 = y$

C  $84 - 6 = y$

D  $42 \times 2 - 6 = y$

Fig. 11
*This question may have more than one correct answer. Select all correct responses.*
4. Which of these triangles appears to be obtuse?
A 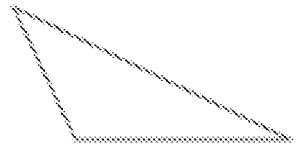
C 
B 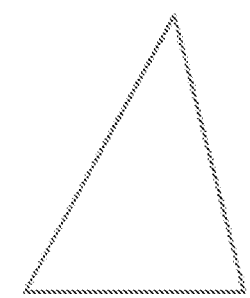
D 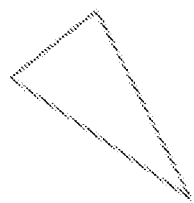

Fig. 12

*This question may have more than one correct answer. Select all correct responses.*

5.

Two friends ate lunch together.

Felicia ate $\frac{1}{3}$ of her sandwich. Daria ate $\frac{1}{4}$ of her pie.

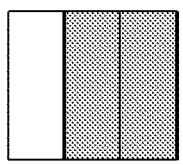 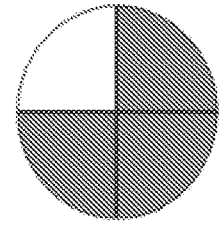

Which of these statements must be true?

A Felicia ate a greater part of her sandwich than Daria ate of her pie because $\frac{1}{3} > \frac{1}{4}$

B Felicia ate more food than Daria ate

C $\frac{2}{3}$ of the sandwich was not eaten by Felicia

D $\frac{3}{3}$ of the pie was not eaten by Daria

Fig. 13
*This question may have more than one correct answer. Select all correct responses.*
1. A group of friends is making cards for a fraction game. The cards need to show equivalent shaded fractions. They start with this card.
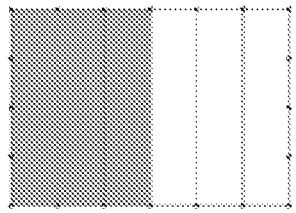
Which of these cards shows a shaded fraction that is equivalent to this card?
A 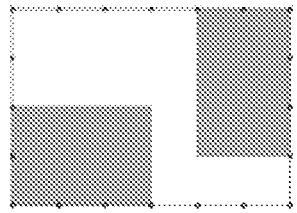   C 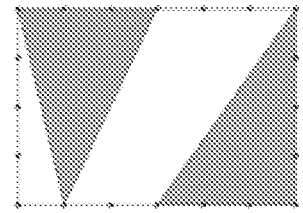
B 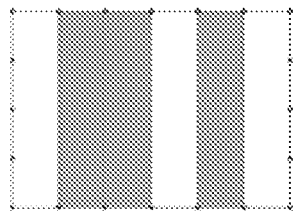   D 

Fig. 14

*This question may have more than one correct answer. Select all correct responses.*

2.

Which of these is possible?

A A rhombus with five sides

B A triangle with two obtuse angles

C A polygon with fewer than four sides

D A polygon with only obtuse angles

*This question may have more than one correct answer. Select all correct*
3. *responses.*

Which points are within the rectangle shown?

*This question may have more than one correct answer. Select all correct responses.*

4.

Duane wants to make a box shaped like a rectangular prism with the same volume as the box shown below.

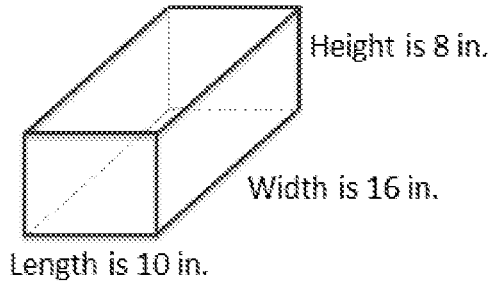

He wants the new box to have a height of 12 inches.

Which of these could be true of the new box?

A The new box could have a length greater than 10 inches

B The new box could have a length greater than 10 inches and a width greater than 16 inches

C The width of the new box could be less than 16 inches and the length could be less than 10 inches

D The area of the base for the new box could be greater than the area of the base for the box shown

Fig. 17

*This question may have more than one correct answer. Select all correct responses.*

5.

Two friends ate lunch together.

Felicia ate $\frac{1}{3}$ of her sandwich. Daria ate $\frac{1}{4}$ of her pie.

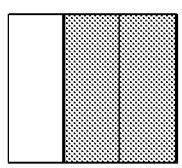
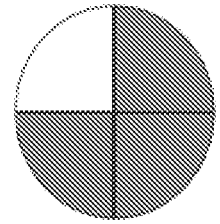

Which of these statements must be true?

A Felicia ate a greater part of her sandwich than Daria ate of her pie because $\frac{1}{3} > \frac{1}{4}$

B Felicia ate more food than Daria ate

C $\frac{2}{3}$ of the sandwich was not eaten by Felicia

D $\frac{3}{3}$ of the pie was not eaten by Daria

Fig. 18
*This question may have more than one correct answer. Select all correct responses.*
1.
A group of friends is making cards for a fraction game. The cards need to show equivalent shaded fractions. They start with this card.
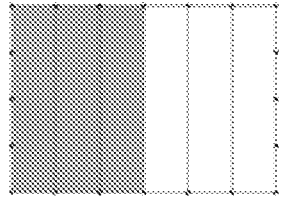
Which of these cards shows a shaded fraction that is equivalent to this card?
A 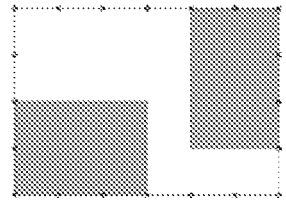    C 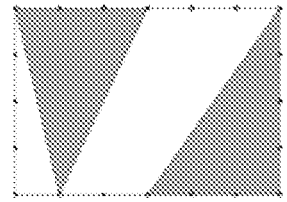
B 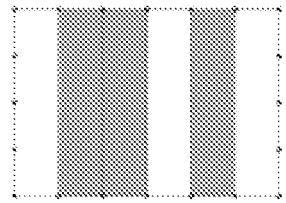    D 

Fig. 19

*This question may have more than one correct answer. Select all correct responses.*

2.

Duane wants to make a box shaped like a rectangular prism with the same volume as the box shown below.

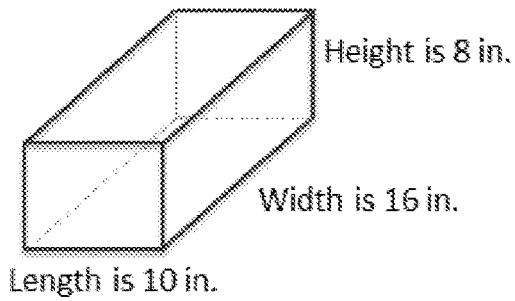

Height is 8 in.
Width is 16 in.
Length is 10 in.

He wants the new box to have a height of 12 inches.

Which of these could be true of the new box?

A The new box could have a length greater than 10 inches

B The new box could have a length greater than 10 inches and a width greater than 16 inches

C The width of the new box could be less than 16 inches and the length could be less than 10 inches

D The area of the base for the new box could be greater than the area of the base for the box shown

*This question may have more than one correct answer. Select all correct responses.*

3.

Which points are within the rectangle shown?

*This question may have more than one correct answer. Select all correct responses.*

5.

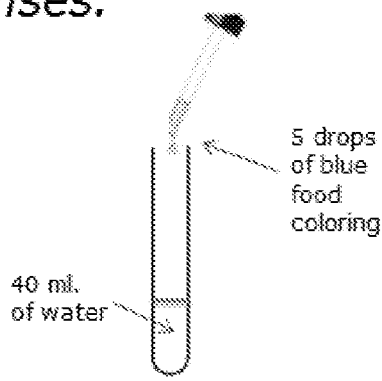

5 drops of blue food coloring are mixed with 40 milliliters of water to produce a blue solution. Which of the following mixtures would produce a solution with same ratio of drops of food coloring to milliliters of water?

A  15 drops in 50 milliliters of water
B  10 drops in 80 milliliters of water
C  0.2 drops in 1.6 milliliters of water
D  6 drops in 48 milliliters of water

6. *This question may have more than one correct answer. Select all correct responses.*

Each point on this graph represents the height and arm span for a student in a math class. One more data point is to be added for Mary. Which of the following points for Mary is *unlikely*?

A   (180, 180)
B   (167, 170)
C   (150, 190)
D   (180, 160)

Fig. 23
*This question may have more than one correct answer. Select all correct responses.*
1.
A group of friends is making cards for a fraction game. The cards need to show equivalent shaded fractions. They start with this card.
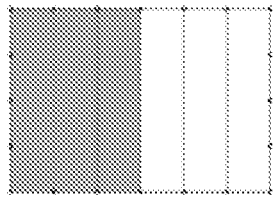
Which of these cards shows a shaded fraction that is equivalent to this card?
A 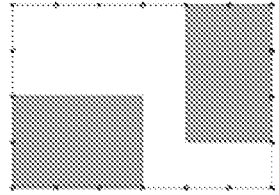    C 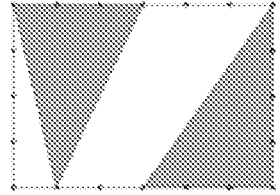
B 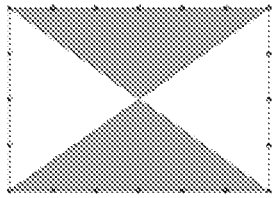    D 

Fig. 24

*This question may have more than one correct answer. Select all correct responses.*

2.

Duane wants to make a box shaped like a rectangular prism with the same volume as the box shown below.

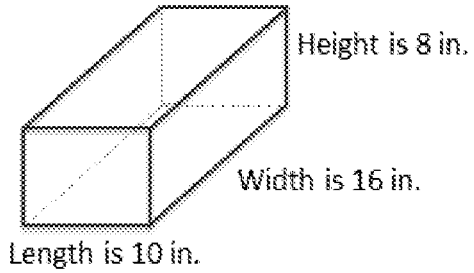

Height is 8 in.
Width is 16 in.
Length is 10 in.

He wants the new box to have a height of 12 inches.

Which of these could be true of the new box?

A The new box could have a length greater than 10 inches

B The new box could have a length greater than 10 inches and a width greater than 16 inches

C The width of the new box could be less than 16 inches and the length could be less than 10 inches

D The area of the base for the new box could be greater than the area of the base for the box shown 3. *This question may have more than one correct answer. Select all correct responses.*

Which points are within the rectangle shown?

4. *This question may have more than one correct answer. Select all correct responses.*

Which of these is a rational number?

A    −2

B    $\dfrac{1}{3}$

C    $1\dfrac{1}{2}$

5. *This question may have more than one correct answer. Select all correct responses.*

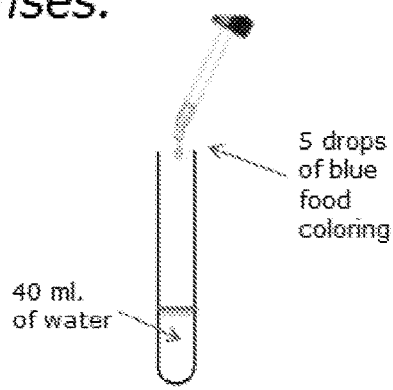

5 drops of blue food coloring are mixed with 40 milliliters of water to produce a blue solution. Which of the following mixtures would produce a solution with same ratio of drops of food coloring to milliliters of water?

A  15 drops in 50 milliliters of water
B  10 drops in 80 milliliters of water
C  0.2 drops in 1.6 milliliters of water
D  6 drops in 48 milliliters of water

6. *This question may have more than one correct answer. Select all correct responses.*

Each point on this graph represents the height and arm span for a student in a math class. One more data point is to be added for Mary. Which of the following points for Mary is *unlikely*?

A  (180, 180)
B  (167, 170)
C  (150 , 190)
D  (180, 160)

Fig. 29
*This question may have more than one correct answer. Select all correct responses.*
1. A group of friends is making cards for a fraction game. The cards need to show equivalent shaded fractions. They start with this card.
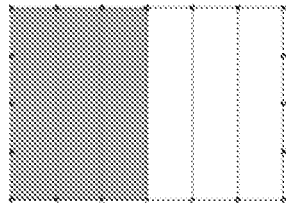
Which of these cards shows a shaded fraction that is equivalent to this card?
A 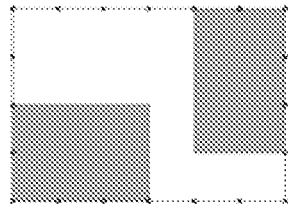   C 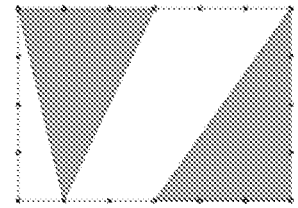
B 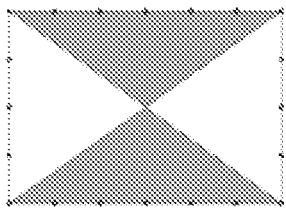   D 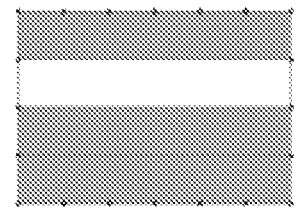

Fig. 30

*This question may have more than one correct answer. Select all correct responses.*

2.

Duane wants to make a box shaped like a rectangular prism with the same volume as the box shown below.

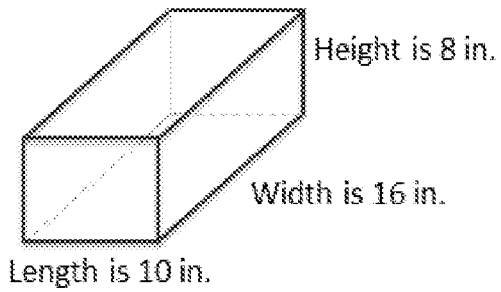
Height is 8 in.
Width is 16 in.
Length is 10 in.

He wants the new box to have a height of 12 inches.

Which of these could be true of the new box?

A The new box could have a length greater than 10 inches

B The new box could have a length greater than 10 inches and a width greater than 16 inches

C The width of the new box could be less than 16 inches and the length could be less than 10 inches

D The area of the base for the new box could be greater than the area of the base for the box shown

Fig. 31

3. *This question may have more than one correct answer. Select all correct responses.*

Which of these is a rational number?

A    −2

B    $\dfrac{1}{3}$

C    $1\dfrac{1}{2}$

D    0.6789992

*This question may have more than one correct answer. Select all correct responses.*

4.

Each point on this graph represents the height and arm span for a student in a math class. One more data point is to be added for Mary. Which of the following points for Mary is *unlikely*?

5. *This question may have more than one correct answer. Select all correct responses.*

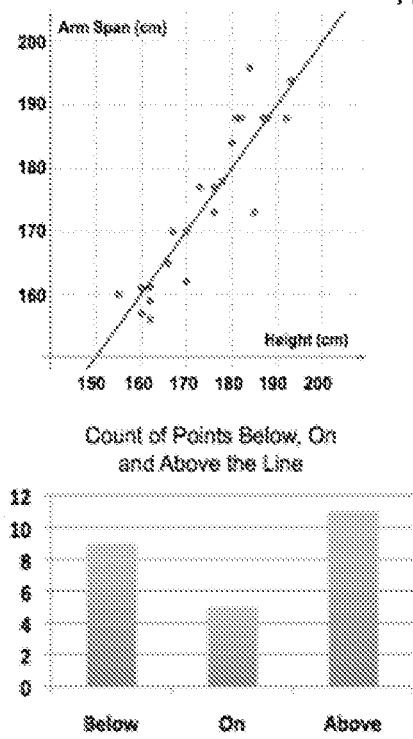

A student sees a pattern in the graph of height and arm span data for her class. She says, "Our arm spans are the same as our heights," and she draws the line for arm span being equal to height on the graph.

To investigate this idea, the class counts the number of students below, on, and above this line and represents this data with a bar graph. Which of the following can be concluded?

A    The bar graph shows the pattern is unlikely to be valid

B    The line graph shows the pattern is likely to be valid

C    In this class there are more students who have arm spans greater than their heights D    In this class there are more students who have heights greater than their arm spans

*This question may have more than one correct answer. Select all correct responses.*

6. Lines *j* and *k* are parallel. Which of the shown movements of only one point could keep the area of triangle ABC constant?

Q    i
R    ii
S    iii
T    iv

*This question may have more than one correct answer. Select all correct responses.*

7. Given only the following, which of these could be used in the transformation of A to A'?

A Rotation

B Two Horizontal Reflections

C Translation

D 1:2 Dilation

Fig. 36

*This question may have more than one correct answer. Select all correct responses.*

8.

A student is given the equation $$2x + 4 = 6x + 2$$

and is asked to solve for x. Which of the following could be used in solving for x?

A As a first step, divide both sides of the equation by 2

B As a first step, subtract 2x from both sides of the equation

C As a first step, subtract 2 from *only* the right side of the equation.

D As a first step, subtract 2 from both sides of the equation

Fig. 42

|  |  |  |  |  | Score |
|---|---|---|---|---|---|
| Student 1 | A |  |  |  | 0 |
| Student 2 |  |  | C |  | 0 |
| Student 3 |  | B |  |  | 1 |
| Student 4 |  |  |  | D | 0 |
| Student 5 |  |  |  |  | 0 |

Fig. 45A

|  |  |  |  |  | Stored |
|---|---|---|---|---|---|
| Student 1 | A | B | C |  | A,B,C |
| Student 2 |  | B | C |  | B,C |
| Student 3 | A |  |  | D | A,D |
| Student 4 |  |  |  |  |  |
| Student 5 |  |  | C | D | C,D |

Fig. 45B

|  |  |  |  |  | Score |
|---|---|---|---|---|---|
| Student 1 | A | B | C |  | 0 |
| Student 2 |  | B | C |  | 1 |
| Student 3 | A |  |  | D | 0 |
| Student 4 |  |  |  |  | 0 |
| Student 5 |  |  | C | D | 0 |

Fig. 48

| Item 1 | Item 2 |
|---|---|
| A, B | No response |
| First Concatenated Response ||
| A, B ||
| Item 1 | Item 2 |
| No response | A, B |
| Second Concatenated Response ||
| A, B ||

Fig. 49A

| Item 1 | Item 2 |
|---|---|
| ABC | D |
| Concatenated Response ||
| ABCD ||
| 01100001011000100110001101100100 ||

Fig. 49B

| Item 1 | Item 2 |
|---|---|
| A, D | B, C |
| Concatenated Response ||
| A,DB,C ||
| 0110000100101100011000100110001100 10110001100100 ||

Fig. 49C

| Item 1 | Item 2 | Item 3 |
|---|---|---|
| A,D | - | B,C |
| Concatenated Response |||
| A,DB,C |||
| 0110000100101100011000100110001100 10110001100100 |||

Fig. 50

| Question 1 | Question 2 |
|---|---|
| 1101 | 0110 |
| Concatenated Response ||
| 11010110 ||

Fig. 51A

|  |  |  |  |  | Stored |
|---|---|---|---|---|---|
| Item 1 | A | B | C |  | 1110 |
| Item 2 |  | B | C |  | 0110 |
| Item 3 | A |  |  | D | 1001 |
| Item 4 |  |  |  |  | 0000 |
| Item 5 |  |  | C | D | 0011 |
| Concatenated | 11100110100100000011 | | | | |

Fig. 51B

|  |  |  |  |  | Stored |
|---|---|---|---|---|---|
| Student 1 | A | B | C |  | 1110 |
| Student 2 |  | B | C |  | 0110 |
| Student 3 | A |  |  | D | 1001 |
| Student 4 |  |  |  |  | 0000 |
| Student 5 |  |  | C | D | 0011 |
| Concatenated | 11100110100100000011 | | | | |

Fig. 52

| Student 1 | | | | | Stored |
|---|---|---|---|---|---|
| Item 1 | | B | C | | 0110 |
| Item 2 | A | | | D | 1001 |
| Item 3 | | | | | 0000 |
| Student 2 | | | | | |
| Item 1 | | B | C | | 0110 |
| Item 2 | | | | | 0000 |
| Item 3 | A | | | | 1000 |
| Student 3 | | | | | |
| Item 1 | A | B | C | D | 1111 |
| Item 2 | | B | | D | 1001 |
| Item 3 | | B | | | 0100 |
| Concatenated | 011010010000011000001000111110010100 | | | | |

SYSTEM AND METHOD FOR GENERATIVE ASSESSMENT ITEM DEVELOPMENT, ENCODING AND ANALYSIS

CROSS-REFERENCE

This application is the U.S. National Stage entry of International Application No. PCT/US2019/039310, filed on Jun. 26, 2019, which claims the benefit of U.S. Provisional Application Ser. No. 62/690,632 filed Jun. 27, 2018 which is hereby incorporated by reference in its entirety.

BACKGROUND OF THE INVENTION

In science, technology, engineering and mathematics (STEM) education along with other subject matter or educational topics, dichotomous items are widely used for evaluation and analysis of learning outcomes. Items can be tasks, activities, or assignments to which a user responds for the purposes of assessment. Dichotomous items include standard single-select multiple choice questions where only one of the responses is identified as correct among the choices. A correct response is typically scored as '1'. Selecting any of the other response is incorrect and is typically scored as '0'. Dichotomous items also can include multiple select items where there can be more than one correct response among the choices. If all and only the correct responses are selected, then the item result is coded as correct. All other possible combinations of responses are scored as incorrect. With only two possible states for the coding, multi-select items remains dichotomous (i.e., 0 or 1).

SUMMARY OF THE INVENTION

Traditional items or dichotomous items have only 2 states, correct, or incorrect. A dichotomous item can only have one right answer while a non-dichotomous generative assessment item can have more than one correct answer or response. A non-dichotomous generative assessment item may also provide multiple states between a correct answer and an incorrect answer. A non-dichotomous generative assessment item herein is capable of collecting much more information from a student, thus it advantageous facilitate identification of meaningful patterns in student responses. In some embodiments, non-dichotomous generative assessment items provide the additional benefit of providing for maximizing information density within a shorter amount of time. By way of example, in contrast to administering 5 separate dichotomous items in the form of 5 separate multiple choice questions to students over ten minutes (i.e., two minutes for each dichotomous item), administering a single non-dichotomous generative assessment item in the form of a single multiple choice question to students over 5 minutes may provide the same or greater amount of information to educators over a shorter period of time. The systems and methods herein advantageous provide an opportunity for an educator to characterize issues and opportunities related to instruction. The systems and methods herein also includes other advantages such as enabling assessments of depth of understanding within a grade and across grades, allowing interpretation by educators in ways they recognize as having implications for classroom practices. Further, the systems and methods herein can provide stakeholders in the educational system with a range of information that can be utilized to improve learning outcomes for all students.

Technical challenges exist when storing responses to traditional, dichotomous items. In a traditional dichotomous assessment item, each response within such a traditional item is treated separately and independently and each such separate response are frequently represented with commas or tabs delimiting the responses. For example, a response including multiple selections to a traditional dichotomous assessment item with four options "A," "B," "C," and "D," a student selecting "A," "B," and "D" would be represented in such a traditional system as either "A,B,D" or "A B D" in a string variable. In practice, this requires the computer memory to store a significant amount of data for each of those three separate A, B, and D selections. The letters A, B, and D in ASCII, require 8 bits each for storage. Because the "A,B,D" selections are not as important as the final correct/non-correct score, the "A,B,D" selection is only temporarily stored in a volatile memory. Once the temporarily stored "A,B,D" selection is compared to a single correct combination of selections and the "0" (incorrect) or "1" (correct) score is provided, the "A,B,D" selection is deleted. Only the binary correct/non-correct score is preserved and the specific combination of selections is lost forever. Hence, a technical tool to preserve data provenance while maximizing data storage for student responses is necessary.

Other technical challenges abound if the temporarily stored responses to dichotomous assessment items were to be compared and processed. Because the traditional system treats any selection as independent, any comparison of these independent responses would result in inconsistent and ambiguous processing by the computer.

Described herein are systems, methods, and media that provide in some embodiments a technological tool that, inter alia, preserves data provenance of student responses to non-dichotomous generative assessment items while maximizing data storage. In further embodiments, the claimed systems, methods, and media promote more consistent and reliable computer processing for responses to non-dichotomous generative assessment items. In some embodiments, the claimed systems, methods, and media form the foundation for a student learning data processing pipeline that would facilitate future machine learning algorithm utilization.

One aspect provided herein is a non-transitory computer-readable storage media encoded with a computer program including instructions executable by a processor to create a non-dichotomous answer processing application for e-learning, the application comprising: a prompt module, displaying a non-dichotomous generative assessment item comprising a series of two or more answer choices; a recording module, receiving a student answer to each answer choice in the series, wherein each student answer comprises an answer selection or an answer non-selection; a storage module, storing the received student answer to each answer choice in the series in a binary format, wherein any answer selection is stored as a first binary number and any answer non-selection is stored as a second binary number; and a concatenation module, concatenating every binarily stored student answer in the series to form a concatenated answer, wherein the concatenated answer does not comprise a delimiter.

In some embodiments, the prompt module further displays two or more non-dichotomous generative assessment items; the recording module further receives the student answer to each answer choice for each of the two or more non-dichotomous generative assessment items; the storage module, further stores the received student answer to each answer choice in the series for each of the two or more non-dichotomous generative assessment items, in the binary format; and the concatenation module, further concatenating every concatenated answer for each of the two or more non-dichotomous generative assessment items to form a multiple item concatenated answer. In some embodiments, the prompt module further displays the non-dichotomous generative assessment item to two or more students; the recording module further receives the student answer to each answer choice in the series for each of the two or more students; the storage module, further stores the received student answer to each answer choice for each of the two or more students, in a binary format; and the concatenation module, further concatenating every concatenated answer for each of the two or more students to form a multiple student concatenated answer. In some embodiments, the two or more answer choices comprise 3, 4, 5, 6, 7, 8, 9, 10 or more answer choices. In some embodiments, the two or more non-dichotomous generative assessment items comprise 3, 4, 5, 6, 7, 8, 9, 10 or more non-dichotomous generative assessment items. In some embodiments, the two or more students comprise 3, 4, 5, 6, 7, 8, 9, 10 or more students. In some embodiments, a size of the concatenated answer is equal to AC bits, wherein AC equals the number of answer choices. In some embodiments, a size of the multiple item concatenated answer is equal to AC*Q bits, and wherein AC equals a number of answer choices, and wherein Q equals a number of non-dichotomous generative assessment items. In some embodiments, a size of the multiple student concatenated answer is equal to AC*S bits, and wherein AC equals a number of answer choices, and wherein S equals a number of students. In some embodiments, the application further comprises a conversion module converting the concatenated answer to a vector representation for use of a machine learning process. In some embodiments, the application further comprises a conversion module converting the multiple item concatenated answer to a vector representation for use of a machine learning process. In some embodiments, the application further comprises a conversion module converting the multiple student concatenated answer to a vector representation for use of a machine learning process. In some embodiments, the application further comprises a training module training a machine learning algorithm on the concatenated answer. In some embodiments, the application further comprises a training module training a machine learning algorithm on the multiple item concatenated answer. In some embodiments, the application further comprises a training module training a machine learning algorithm on the multiple student concatenated answer. In some embodiments, the application further comprises a machine learning module performing a machine learning algorithm on the concatenated answer to determine an answer pattern. In some embodiments, the application further comprises a machine learning module performing a machine learning algorithm on the multiple item concatenated answer to determine an answer pattern. In some embodiments, the application further comprises a machine learning module performing a machine learning algorithm on the multiple student concatenated answer to determine an answer pattern. In some embodiments, the concatenated answer is not ambiguous. In some embodiments, the multiple item concatenated answer is not ambiguous. In some embodiments, the multiple student concatenated answer is not ambiguous. In some embodiments, the application further comprises a blockchain module, storing the concatenated answer in an immutable data storage. In some embodiments, the application further comprises a blockchain module, storing the multiple question concatenated answer in an immutable data storage. In some embodiments, the application further comprises a blockchain module, storing the multiple student concatenated answer in an immutable data storage. In some embodiments, the application further comprises a histogram module forming a histogram from the concatenated answer. In some embodiments, the application further comprises a histogram module forming a histogram from the multiple item concatenated answer. In some embodiments, the application further comprises a histogram module forming a histogram from the multiple student concatenated answer. In some embodiments, the histogram comprises a histogram of the possible combinations of answer choices. In some embodiments, the first binary number is 1 and the second binary number is 0. In some embodiments, the first binary number is 0 and the second binary number is 1. In some embodiments, each of the two or more answer choices is not independent from each other. In some embodiments, the delimiter comprises a comma, a semicolon, a colon, a tab, a bracket, a parenthesis, a hashtag, a quotation mark, an asterisk, or any combination thereof. In some embodiments, the delimiter is not located between the two or more answer choices.

Another aspect provided herein is a computer-implemented method for an e-learning non-dichotomous answer processing, the method comprising: displaying, by the computer, a non-dichotomous generative assessment item comprising a series of two or more answer choices; receiving, by the computer, a student answer to each answer choice in the series, wherein each student answer comprises an answer selection or an answer non-selection; storing, by the computer, the received student answer to each answer choice in the series in a binary format, wherein any answer selection is stored as a first binary number and any answer non-selection is stored as a second binary number; and concatenating, by the computer, every binarily stored student answer in the series to form a concatenated answer, wherein the concatenated answer does not comprise a delimiter.

In some embodiments: the prompt module further displays two or more non-dichotomous generative assessment items; the recording module further receives the student answer to each answer choice for each of the two or more non-dichotomous generative assessment items; the storage module, further stores the received student answer to each answer choice in the series for each of the two or more non-dichotomous generative assessment items, in the binary format; and the concatenation module, further concatenating every concatenated answer for each of the two or more non-dichotomous generative assessment items to form a multiple item concatenated answer. In some embodiments, the prompt module further displays the non-dichotomous generative assessment item to two or more students; the recording module further receives the student answer to each answer choice in the series for each of the two or more students; the storage module, further stores the received student answer to each answer choice for each of the two or more students, in a binary format; and the concatenation module, further concatenating every concatenated answer for each of the two or more students to form a multiple student concatenated answer. In some embodiments, the two or more answer choices comprise 3, 4, 5, 6, 7, 8, 9, 10 or more answer choices. In some embodiments, the two or more non-dichotomous generative assessment items comprise 3, 4, 5, 6, 7, 8, 9, 10 or more non-dichotomous generative assessment items. In some embodiments, the two or more students comprise 3, 4, 5, 6, 7, 8, 9, 10 or more students. In some embodiments, a size of the concatenated answer is equal to AC bits, wherein AC equals the number of answer choices. In some embodiments, a size of the multiple item concatenated answer is equal to AC*Q bits, and wherein AC equals a number of answer choices, and wherein Q equals a number of non-dichotomous generative assessment items. In some embodiments, a size of the multiple student concatenated answer is equal to AC*S bits, and wherein AC equals a number of answer choices, and wherein S equals a number of students. In some embodiments, the method further comprises converting, by a conversion module, the concatenated answer to a vector representation for use of a machine learning process. In some embodiments, the method further comprises converting, by a conversion module, the multiple item concatenated answer to a vector representation for use of a machine learning process. In some embodiments, the method further comprises converting, by a conversion module, the multiple student concatenated answer to a vector representation for use of a machine learning process. In some embodiments, the method further comprises training, by a training module, a machine learning algorithm on the concatenated answer. In some embodiments, the method further comprises training, by a training module, a machine learning algorithm on the multiple item concatenated answer. In some embodiments, the method further comprises training, by a training module, a machine learning algorithm on the multiple student concatenated answer. In some embodiments, the method further comprises performing, by a machine learning module, a machine learning algorithm on the concatenated answer to determine an answer pattern. In some embodiments, the method further comprises performing by a machine learning module, a machine learning algorithm on the multiple item concatenated answer to determine an answer pattern. In some embodiments, the method further comprises performing by a machine learning module, a machine learning algorithm on the multiple student concatenated answer to determine an answer pattern. In some embodiments, the concatenated answer is not ambiguous. In some embodiments, the multiple item concatenated answer is not ambiguous. In some embodiments, the multiple student concatenated answer is not ambiguous. In some embodiments, the method further comprises storing, by a blockchain module, the concatenated answer in an immutable data storage. In some embodiments, the method further comprises storing, by a blockchain module, the multiple question concatenated answer in an immutable data storage. In some embodiments, the method further comprises storing, by a blockchain module, the multiple student concatenated answer in an immutable data storage. In some embodiments, the method further comprises forming, by a histogram module, a histogram from the concatenated answer. In some embodiments, the method further comprises forming, by a histogram module, a histogram from the multiple item concatenated answer. In some embodiments, the method further comprises forming, by a histogram module, a histogram from the multiple student concatenated answer. In some embodiments, the histogram comprises a histogram of the possible combinations of answer choices. In some embodiments, the first binary number is 1 and the second binary number is 0. In some embodiments, the first binary number is 0 and the second binary number is 1. In some embodiments, each of the two or more answer choices is not independent from each other. In some embodiments, the delimiter comprises a comma, a semicolon, a colon, a tab, a bracket, a parenthesis, a hashtag, a quotation mark, an asterisk, or any combination thereof. In some embodiments, the delimiter is not located between the two or more answer choices.

Another aspect provided herein is a computer-implemented system comprising: a digital processing device comprising: at least one processor, an operating system configured to perform executable instructions, a memory, and a computer program including instructions executable by the digital processing device to create a non-dichotomous answer processing application for e-learning, the application comprising: a prompt module, displaying a non-dichotomous generative assessment item comprising a series of two or more answer choices; a recording module, receiving a student answer to each answer choice in the series, wherein each student answer comprises an answer selection or an answer non-selection; a storage module, storing the received student answer to each answer choice in the series in a binary format, wherein any answer selection is stored as a first binary number and any answer non-selection is stored as a second binary number; and a concatenation module, concatenating every binarily stored student answer in the series to form a concatenated answer, wherein the concatenated answer does not comprise a delimiter. In some embodiments: the prompt module further displays two or more non-dichotomous generative assessment items; the recording module further receives the student answer to each answer choice for each of the two or more non-dichotomous generative assessment items; the storage module, further stores the received student answer to each answer choice in the series for each of the two or more non-dichotomous generative assessment items, in the binary format; and the concatenation module, further concatenating every concatenated answer for each of the two or more non-dichotomous generative assessment items to form a multiple item concatenated answer. In some embodiments, the prompt module further displays the non-dichotomous generative assessment item to two or more students; the recording module further receives the student answer to each answer choice in the series for each of the two or more students; the storage module, further stores the received student answer to each answer choice for each of the two or more students, in a binary format; and the concatenation module, further concatenating every concatenated answer for each of the two or more students to form a multiple student concatenated answer. In some embodiments, the two or more answer choices comprise 3, 4, 5, 6, 7, 8, 9, 10 or more answer choices. In some embodiments, the two or more non-dichotomous generative assessment items comprise 3, 4, 5, 6, 7, 8, 9, 10 or more non-dichotomous generative assessment items. In some embodiments, the two or more students comprise 3, 4, 5, 6, 7, 8, 9, 10 or more students. In some embodiments, a size of the concatenated answer is equal to AC bits, wherein AC equals the number of answer choices. In some embodiments, a size of the multiple item concatenated answer is equal to AC*Q bits, and wherein AC equals a number of answer choices, and wherein Q equals a number of non-dichotomous generative assessment items. In some embodiments, a size of the multiple student concatenated answer is equal to AC*S bits, and wherein AC equals a number of answer choices, and wherein S equals a number of students. In some embodiments, the application further comprises a conversion module converting the concatenated answer to a vector representation for use of a machine learning process. In some embodiments, the application further comprises a conversion module converting the multiple item concatenated answer to a vector representation for use of a machine learning process. In some embodiments, the application further comprises a conversion module converting the multiple student concatenated answer to a vector representation for use of a machine learning process. In some embodiments, the application further comprises a training module training a machine learning algorithm on the concatenated answer. In some embodiments, the application further comprises a training module training a machine learning algorithm on the multiple item concatenated answer. In some embodiments, the application further comprises a training module training a machine learning algorithm on the multiple student concatenated answer. In some embodiments, the application further comprises a machine learning module performing a machine learning algorithm on the concatenated answer to determine an answer pattern. In some embodiments, the application further comprises a machine learning module performing a machine learning algorithm on the multiple item concatenated answer to determine an answer pattern. In some embodiments, the application further comprises a machine learning module performing a machine learning algorithm on the multiple student concatenated answer to determine an answer pattern. In some embodiments, the concatenated answer is not ambiguous. In some embodiments, the multiple item concatenated answer is not ambiguous. In some embodiments, the multiple student concatenated answer is not ambiguous. In some embodiments, the application further comprises a blockchain module, storing the concatenated answer in an immutable data storage. In some embodiments, the application further comprises a blockchain module, storing the multiple question concatenated answer in an immutable data storage. In some embodiments, the application further comprises a blockchain module, storing the multiple student concatenated answer in an immutable data storage. In some embodiments, the application further comprises a histogram module forming a histogram from the concatenated answer. In some embodiments, the application further comprises a histogram module forming a histogram from the multiple item concatenated answer. In some embodiments, the application further comprises a histogram module forming a histogram from the multiple student concatenated answer. In some embodiments, the histogram comprises a histogram of the possible combinations of answer choices. In some embodiments, the first binary number is 1 and the second binary number is 0. In some embodiments, the first binary number is 0 and the second binary number is 1. In some embodiments, each of the two or more answer choices is not independent from each other. In some embodiments, the delimiter comprises a comma, a semicolon, a colon, a tab, a bracket, a parenthesis, a hashtag, a quotation mark, an asterisk, or any combination thereof. In some embodiments, the delimiter is not located between the two or more answer choices.

In another aspect disclosed herein are computer-implemented methods for generative assessment item development, the method comprising: obtaining a released assessment item, wherein the released assessment item comprising a correct answer or a combination of correction answers; generating a question for the generative assessment item, wherein the question comprises information in the correct answer or the combination correction of answers of the released assessment item; and generating a plurality of responses to the question for the generative assessment item, wherein the plurality of responses comprises at least two responses that are not independent, and wherein the plurality of responses are non-dichotomous.

In another aspect, disclosed herein are computer-implemented methods for generative assessment item analysis, the method comprising: generating, by a computer, a plurality of responses to a question of the generative assessment item, wherein the plurality of responses comprises at least two responses that are not independent, and wherein the plurality of responses are non-dichotomous; and developing a set of rules for encoding the plurality of responses, wherein encoding of the plurality of responses generates a plurality of patterns, each pattern uniquely represent a response of the plurality of responses, wherein the plurality of patterns comprising: one or more first patterns representing baseline understanding of the question; one or more second patterns representing accurate understanding of the question; and one or more third patterns representing intermediate understanding of the question.

In yet another aspect, disclosed herein are computer-implemented methods for generative assessment item analysis, the method comprising: receiving, by a computer, a response to the generative assessment item from a user, wherein the response is selected by the user among a plurality of responses; encoding, by the computer, the response with a pre-determined set of rules thereby generating an encoded response, the encoded response comprising a pattern, wherein the pattern uniquely represents the response; and analyzing, by the computer, the pattern and a plurality of patterns, the plurality of patterns corresponding to at least a portion of the plurality of responses to the generative assessment item.

In some embodiments, the method further comprises receiving the response to the generative assessment item from the user in a group-based cloud computing system. In some embodiments, the generative assessment item is one or more of: a task, an assignment, an activity, a multiple choice question, and an order list question. In some embodiments, the generative assessment item is a non-dichotomous item. In some embodiments, when scored non-dichotomously, the plurality of responses contains at least 2×, 4×, 8×, or 16× information than scoring the plurality of responses dichotomously. In some embodiments, the method herein further comprises providing a generative assessment item to a user. In some embodiments, providing a generative assessment item to a user comprises presenting a generative assessment item in a group-based cloud computing system. In some embodiments, the group-based cloud computing system comprises: (a) a set of communications elements configured to provide a cloud network infrastructure; (b) an integrated array of representation tools; and (c) a plurality of collaborative activities deploying the set of communications elements and the integrated array of representation tools. In some embodiments, the group-based cloud computing system comprises a number of virtual classrooms, the number of virtual classrooms configured to work simultaneously and independently. In some embodiments, at least one of the numbers of virtual classrooms is author-able at a group activity level and at a learner level. In some embodiments, the method further comprises allowing the user to: create a coded object or behavior, post an image with embedded code in a gallery, select an object from the gallery to be added to the user's work space, or a combination thereof. In some embodiments, the method further comprises allowing the user or an activity author to select when and to whom a student space or a group-shared space is available. In some embodiments, the method further comprises allowing the user to turn on or off updates in the student space or the group-shared space. In some embodiments, the student space or the group-shared space is virtual space accessible by the user via a user interface. In some embodiments, the method further comprises allowing the user to code using one or more agent-based modeling languages. In some embodiments, the method further comprises combining an additional encoding with the encoded response to generate a second encoded response.

In some embodiments, the additional encoding is based on information of the user. In some embodiments, the information of the user comprises demographical information. In some embodiments, the encoded response may include one or more number, letter, symbol, or a combination thereof. In some embodiments, analyzing the pattern and a plurality of patterns comprises generating a histogram of the pattern and the plurality of patterns. In some embodiments, the histogram indicates a frequency of occurrence of one or more responses among the plurality of responses based on the pattern and the plurality of patterns. In some embodiments, each of the plurality of responses is uniquely associated with a pre-determined pattern. In some embodiments, at least two among the response and the plurality of responses are not independent. In some embodiments, the pre-determined set of rules comprises one or more of: base-2 numbering rules, base-10 numbering rules, base-8 numbering rules, and base-16 numbering rules. In some embodiments, the generative assessment item is related to science, technology, engineering, and mathematics (STEM).

In some embodiments, the generative assessment item is related to one or more of algebra, physics, geometry, pre-calculus, calculus, statistics, biology, chemistry, civil engineering, electronics, and architecture. In some embodiments, the generative assessment item is related to math, writing, history, reading, literature, science, art, music, foreign language, and social studies. In some embodiments, the generative assessment item is related to a level of learning for a kindergartener level, a first grade level, a second grade level, a third grade level, a fourth grade level, a fifth grade level, a sixth grade level, a seventh grade level, an eighth grade level, a ninth grade level, a tenth grade level, an eleventh grade level, a twelfth grade level, a college level, or post-graduate level. In some embodiments, the generative assessment item is related to preparation for or taking a standardized test including the Wechsler Individual Achievement Test (WIAT), Kaufman Test of Educational Achievement (KTEA), Woodcock-Johnson Tests of Achievement (WJ), Peabody Individual Achievement Test (PIAT-R), National Assessment of Educational Progress (NAEP), General Educational Development (GED), Iowa Test of Basic Skills (ITBS), Scholastic Aptitude Test (SAT), Classic Learning Test (CLT), Former English Language Proficiency Test (ELPT), Preliminary SAT/National Merit Scholarship Qualifying Test (PSAT/NMSQT), Independent School Entrance Examination (ISEE), Secondary School Admission Test (SSAT), High School Placement Test (HSPT), Cooperative admissions examination program (COOP), Specialized High School Admissions Test (SHSAT), Scholastic Aptitude Test (SAT), English Language Proficiency Test (ELPT), American College Test (ACT), Classic Learning Test (CLT), Allied Health Professions Admission Test (AHPAT), Dental Admission Test (DAT), Graduate Management Admission Test (GMAT), Graduate Record Examination (GRE), Law School Admission Test (LSAT), Miller Analogies Test (MAT), Medical College Admission Test (MCAT), Optometry Admission Test (OAT), Pharmacy College Admission Test (PCAT), Veterinary College Admission Test (VCAT), Wiesen Test of Mechanical Aptitude (WTMA), Test of English for International Communication (TOEIC), Test of English as a Foreign Language (TOEFL), International English Language Testing System (IELTS), Certified Public Accountant (CPA), Examination for Professional Practice in Psychology (EPPP), Fundamentals of Engineering (FE), Multistate Bar Examination (MBE), Multistate Pharmacy Jurisprudence Examination (MPJE), Multistate Professional Responsibility Examination (MPRE), North American Pharmacist Licensure Examination (NAPLEX), National Council Licensure Examination for Practical Nurses (NCLEX-PN), National Council Licensure Examination for Registered Nurses (NCLEX-RN), Physician Assistant National Certifying Exam for physician assistants (PA), Principles and Practice of Engineering Exam, Uniform Certified Public Accountant Examination, Uniform Combined State Law Examination, Uniform Securities Agent State Law Examination, United States Medical Licensing Examination, USPTO registration examination, or any combination thereof.

In yet another aspect, disclose herein are computer-implemented systems for generative assessment item development, the system comprising: a digital processing device comprising: at least one processor, an operating system configured to perform executable instructions, a memory, and a computer program including instructions executable by the digital processing device to create an application comprising: a software module obtaining a released assessment item, wherein the released assessment item comprising a correct answer or a combination of correction answers; a software module generating a question for the generative assessment item, wherein the question comprises information in the correct answer or the combination correction of answers; and a software module generating a plurality of responses to the question for the generative assessment item, wherein the plurality of responses comprises at least two responses that are not independent, and wherein the plurality of responses are non-dichotomous.

In yet another aspect, disclose herein are computer-implemented systems for generative assessment item development, the system comprising: a digital processing device comprising: at least one processor, an operating system configured to perform executable instructions, a memory, and a computer program including instructions executable by the digital processing device to create an application comprising: a software module generating a plurality of responses to a question of the generative assessment item, wherein the plurality of responses comprises at least two responses that are not independent, and wherein the plurality of responses are non-dichotomous; and a software module developing a set of rules for encoding the plurality of responses, wherein encoding of the plurality of responses generates a plurality of patterns, each pattern uniquely represent a response of the plurality of responses, wherein the plurality of patterns comprising: one or more first patterns representing baseline understanding of the question; one or more second patterns representing accurate understanding of the question; and one or more third patterns representing intermediate understanding of the question.

In yet another aspect, disclose herein are computer-implemented systems for generative assessment item development, the system comprising: a digital processing device comprising: at least one processor, an operating system configured to perform executable instructions, a memory, and a computer program including instructions executable by the digital processing device to create an application comprising: a software module receiving a response to the generative assessment item from a user, wherein the response is selected by the user among a plurality of responses; a software module encoding the response with a pre-determined set of rules thereby generating an encoded response, the encoded response comprising a pattern, wherein the pattern uniquely represents the response; and a software module analyzing the pattern and a plurality of patterns, the plurality of patterns corresponding to at least a portion of the plurality of responses to the generative assessment item.

In some embodiments, the generative assessment item is one or more of: a task, an assignment, an activity, a multiple choice question, and an order list question. In some embodiments, the generative assessment item is a non-dichotomous item. In some embodiments, when scored non-dichotomously, the plurality of responses contains at least 2×, 4×, 8×, or 16× information than scoring the plurality of responses dichotomously. In some embodiments, the system herein further comprises a software module providing a generative assessment item to a user. In some embodiments, providing a generative assessment item to a user comprises presenting a generative assessment item in a group-based cloud computing system. In some embodiments, the system further comprises a software module receiving the response to the generative assessment item from the user in a group-based cloud computing system. In some embodiments, the group-based cloud computing system comprises: (a) a set of communications elements configured to provide a cloud network infrastructure; (b) an integrated array of representation tools; and (c) a plurality of collaborative activities deploying the set of communications elements and the integrated array of representation tools. In some embodiments, the group-based cloud computing system comprises a number of virtual classrooms, the number of virtual classrooms configured to work simultaneously and independently. In some embodiments, at least one of the number of virtual classrooms are author-able at a group activity level and at a learner level. In some embodiments, the system further comprises allowing the user to: create a coded object or behavior, post an image with embedded code in a gallery, select an object from the gallery to be added to the user's work space, or a combination thereof. In some embodiments, further comprises allowing the user or an activity author to select when and to whom a student space or a group-shared space is available. In some embodiments, the system further comprises allowing the user to turn on or off updates in the student space or the group-shared space. In some embodiments, the student space or the group-shared space is virtual space accessible by the user via a user interface. In some embodiments, the system further comprises allowing the user to code using one or more agent-based modeling languages. In some embodiments, the system further comprises a software module combining an additional encoding with the encoded response to generate a second encoded response. In some embodiments, the additional encoding is based on information of the user. In some embodiments, the information of the user comprises demographical information. In some embodiments, the encoded response may include one or more number, letter, symbol, or a combination thereof. In some embodiments, analyzing the pattern and a plurality of patterns comprises generating a histogram of the pattern and the plurality of patterns. In some embodiments, the histogram indicates a frequency of occurrence of one or more responses among the plurality of responses based on the pattern and the plurality of patterns. In some embodiments, each of the plurality of responses is uniquely associated with a pre-determined pattern. In some embodiments, at least two among the response and the plurality of responses are not independent. In some embodiments, the pre-determined set of rules comprises one or more of: base-2 numbering rules, base-10 numbering rules, base-8 numbering rules, and base-16 numbering rules. In some embodiments, the generative assessment item is related to science, technology, engineering, and mathematics (STEM). In some embodiments, the generative assessment item is related to one or more of algebra, physics, geometry, pre-calculus, calculus, statistics, biology, chemistry, civil engineering, electronics, and architecture. In some embodiments, the generative assessment item is related to math, writing, history, reading, literature, science, art, music, foreign language, and social studies. In some embodiments, the generative assessment item is related to a level of learning for a kindergartener level, a first grade level, a second grade level, a third grade level, a fourth grade level, a fifth grade level, a sixth grade level, a seventh grade level, an eighth grade level, a ninth grade level, a tenth grade level, an eleventh grade level, a twelfth grade level, a college level, or post-graduate level.

In yet another aspect, disclosed herein are non-transitory computer-readable storage media encoded with a computer program including instructions executable by a processor to create an application comprising: a software module obtaining a released assessment item, wherein the released assessment item comprising a correct answer or a combination of correction answers; a software module generating a question for the generative assessment item, wherein the question comprises information in the correct answer or the combination correction of answers; and a software module generating a plurality of responses to the question for the generative assessment item, wherein the plurality of responses comprises at least two responses that are not independent, and wherein the plurality of responses are non-dichotomous.

In yet another aspect, disclosed herein are non-transitory computer-readable storage media encoded with a computer program including instructions executable by a processor to create an application comprising: a software module generating a plurality of responses to a question of the generative assessment item, wherein the plurality of responses comprises at least two responses that are not independent, and wherein the plurality of responses are non-dichotomous; and a software module developing a set of rules for encoding the plurality of responses, wherein encoding of the plurality of responses generates a plurality of patterns, each pattern uniquely represent a response of the plurality of responses, wherein the plurality of patterns comprising: one or more first patterns representing baseline understanding of the question; one or more second patterns representing accurate understanding of the question; and one or more third patterns representing intermediate understanding of the question.

In yet another aspect, disclosed herein are non-transitory computer-readable storage media encoded with a computer program including instructions executable by a processor to create an application comprising: a software module receiving a response to the generative assessment item from a user, wherein the response is selected by the user among a plurality of responses; a software module encoding the response with a pre-determined set of rules thereby generating an encoded response, the encoded response comprising a pattern, wherein the pattern uniquely represents the response; and a software module analyzing the pattern and a plurality of patterns, the plurality of patterns corresponding to at least a portion of the plurality of responses to the generative assessment item.

In some embodiments, the generative assessment item is one or more of: a task, an assignment, an activity, a multiple choice question, and an order list question. In some embodiments, the generative assessment item is a non-dichotomous item. In some embodiments, when scored non-dichotomously, the plurality of responses contains at least 2×, 4×, 8×, or 16× information than scoring the plurality of responses dichotomously. In some embodiments, the media further comprises a software module providing a generative assessment item to a user. In some embodiments, a software module providing a generative assessment item to a user comprises presenting a generative assessment item in a group-based cloud computing system. In some embodiments, the media further comprises a software module receiving the response to the generative assessment item from the user in a group-based cloud computing system. In some embodiments, the group-based cloud computing system comprises: (a) a set of communications elements configured to provide a cloud network infrastructure; (b) an integrated array of representation tools; and (c) a plurality of collaborative activities deploying the set of communications elements and the integrated array of representation tools. In some embodiments, the group-based cloud computing system comprises a number of virtual classrooms, the number of virtual classrooms configured to work simultaneously and independently. In some embodiments, at least one of the number of virtual classrooms are author-able at a group activity level and at a learner level. In some embodiments, the media further comprises allowing the user to: create a coded object or behavior, post an image with embedded code in a gallery, select an object from the gallery to be added to the user's work space, or a combination thereof. In some embodiments, the media further comprises allowing the user or an activity author to select when and to whom a student space or a group-shared space is available. In some embodiments, the media further comprises allowing the user to turn on or off updates in the student space or the group-shared space. In some embodiments, the student space or the group-shared space is virtual space accessible by the user via a user interface. In some embodiments, the media further comprising allowing the user to code using one or more agent-based modeling languages. In some embodiments, the additional encoding is based on information of the user. In some embodiments, the information of the user comprises demographical information. In some embodiments, the encoded response may include one or more number, letter, symbol, or a combination thereof. In some embodiments, analyzing the pattern and a plurality of patterns comprises generating a histogram of the pattern and the plurality of patterns. In some embodiments, the histogram indicates a frequency of occurrence of one or more responses among the plurality of responses based on the pattern and the plurality of patterns. In some embodiments, each of the plurality of responses is uniquely associated with a pre-determined pattern. In some embodiments, at least two among the response and the plurality of responses are not independent. In some embodiments, the pre-determined set of rules comprises one or more of: base-2 numbering rules, base-10 numbering rules, base-8 numbering rules, and base-16 numbering rules. In some embodiments, the generative assessment item is related to science, technology, engineering, and mathematics (STEM). In some embodiments, the generative assessment item is related to one or more of algebra, physics, geometry, pre-calculus, calculus, statistics, biology, chemistry, civil engineering, electronics, and architecture. In some embodiments, the generative assessment item is related to math, writing, history, reading, literature, science, art, music, foreign language, and social studies. In some embodiments, the generative assessment item is related to a level of learning for a kindergartener level, a first grade level, a second grade level, a third grade level, a fourth grade level, a fifth grade level, a sixth grade level, a seventh grade level, an eighth grade level, a ninth grade level, a tenth grade level, an eleventh grade level, a twelfth grade level, a college level, or post-graduate level.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 3 shows a first non-limiting examples of a generative assessment item;

FIG. 4 shows a second non-limiting examples of a generative assessment item;

FIG. 5 shows a third non-limiting examples of a generative assessment item;

FIG. 6 shows a fourth non-limiting examples of a generative assessment item;

FIG. 7 shows a fifth non-limiting examples of a generative assessment item;

FIG. 8 shows a sixth non-limiting examples of a generative assessment item;

FIG. 9 shows a seventh non-limiting examples of a generative assessment item;

FIG. 10 shows a eighth non-limiting examples of a generative assessment item;

FIG. 11 shows a ninth non-limiting examples of a generative assessment item;

FIG. 12 shows a tenth non-limiting examples of a generative assessment item;

FIG. 13 shows a eleventh non-limiting examples of a generative assessment item;

FIG. 14 shows a twelfth non-limiting examples of a generative assessment item;

FIG. 16 shows a fourteenth non-limiting examples of a generative assessment item;

FIG. 17 shows a fifteenth non-limiting examples of a generative assessment item;

FIG. 18 shows a sixteenth non-limiting examples of a generative assessment item;

FIG. 19 shows a seventeenth non-limiting examples of a generative assessment item;

FIG. 21 shows a nineteenth non-limiting examples of a generative assessment item;

FIG. 23 shows a twenty-first non-limiting examples of a generative assessment item;

FIG. 24 shows a twenty-second non-limiting examples of a generative assessment item;

FIG. 26 shows a twenty-fourth non-limiting examples of a generative assessment item;

FIG. 27 shows a twenty-fifth non-limiting examples of a generative assessment item;

FIG. 29 shows a twenty-seventh non-limiting examples of a generative assessment item;

FIG. 30 shows a twenty-eighth non-limiting examples of a generative assessment item;

FIG. 31 shows a twenty-ninth non-limiting examples of a generative assessment item;

FIG. 33 shows a thirty-first non-limiting examples of a generative assessment item;

FIG. 36 shows a thirty-fourth non-limiting examples of a generative assessment item;

FIG. 42 shows a non-limiting table of a current single select multiple choice test across students;

FIG. 45A shows a first non-limiting table displaying the scoring of a first single select multiple choice test across students;

FIG. 45B shows a second non-limiting table displaying the scoring of a first single select multiple choice test across students;

FIG. 48 shows a first non-limiting table displaying a plurality of concatenated responses;

FIG. 49A shows a second non-limiting table displaying a plurality of concatenated responses;

FIG. 49B shows a third non-limiting table displaying a plurality of concatenated responses;

FIG. 49C shows a fourth non-limiting table displaying a plurality of concatenated responses;

FIG. 50 shows a non-limiting table displaying a concatenated scoring of a pattern-based test across two questions;

FIG. 51A shows a non-limiting table displaying the scoring of a pattern-based test across a plurality of non-dichotomous generative assessment items;

FIG. 51B shows a non-limiting table displaying the scoring of a pattern-based test across a plurality of students; and FIG. 52 shows a non-limiting table displaying the scoring of a pattern-based test across a plurality of non-dichotomous generative assessment items and a plurality of students.

DETAILED DESCRIPTION OF THE INVENTION

In some embodiments, the non-dichotomous generative assessment items herein enable the collection and storage of more information regarding a student answer, in a format that is compact and easy to process, to enable identification of meaningful patterns in student responses. In some embodiments, the non-dichotomous generative assessment items herein enable analysis of frequency or relative presence and allow for the conveyance of partial credit. In some embodiments, the generative assessment item is related to one or more of algebra, physics, geometry, pre-calculus, calculus, statistics, biology, chemistry, civil engineering, electronics, and architecture. In some embodiments, the generative assessment item is related to math, writing, history, reading, literature, science, art, music, foreign language, and social studies. In some embodiments, the generative assessment item is related to a level of learning for a kindergartener level, a first grade level, a second grade level, a third grade level, a fourth grade level, a fifth grade level, a sixth grade level, a seventh grade level, an eighth grade level, a ninth grade level, a tenth grade level, an eleventh grade level, a twelfth grade level, a college level, or post-graduate level.

Provided herein are non-dichotomous answer processing media, system, and methods for e-learning applications comprising: a prompt module, a recording module, a storage module, and a concatenation module. In some embodiments, the prompt module displays a non-dichotomous generative assessment item. In some embodiments, the non-dichotomous generative assessment item comprises a series of two or more answer choices. In some embodiments, the recording module receives a student answer to each answer choice in the series. In some embodiments, each student answer comprises an answer selection or an answer non-selection. In some embodiments, the storage module stores the received student answer to each answer choice. In some embodiments, the storage module stores the received student answer to each answer choice in the series in a binary format. In some embodiments, any answer selection is stored as a first binary number and any answer non-selection is stored as a second binary number. In some embodiments, the concatenation module concatenates every binarily stored student answer in the series. In some embodiments, the concatenation module concatenates every binarily stored student answer in the series to form a concatenated answer. In some embodiments, the concatenated answer does not comprise a delimiter. In some embodiments, the two or more answer choices comprise 3, 4, 5, 6, 7, 8, 9, 10 or more answer choices.

Figure 40:
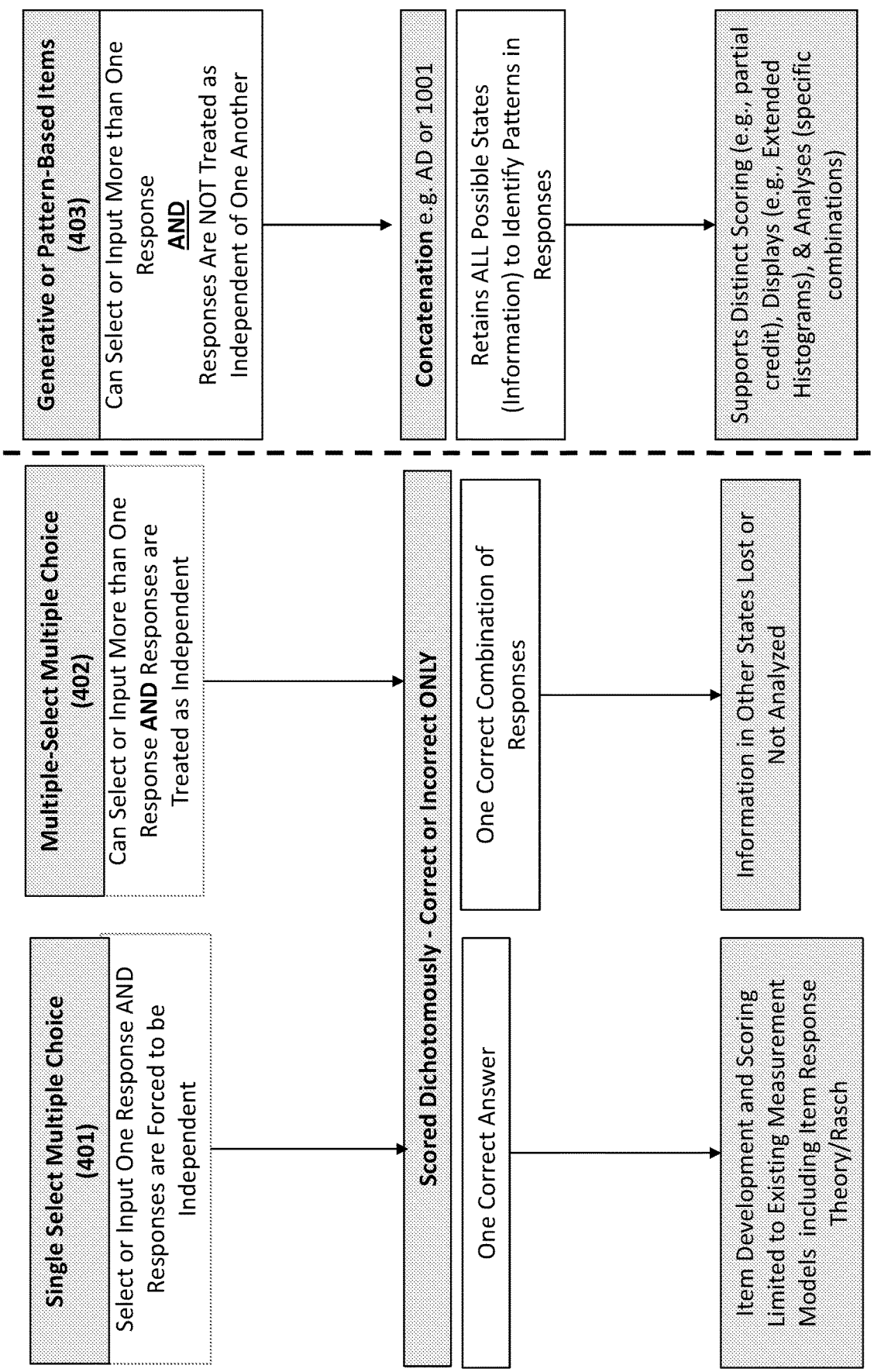
FIG. 40 shows a first non-limiting schematic diagram of dichotomous and non-dichotomous generative or pattern-based systems.
Figure 41:
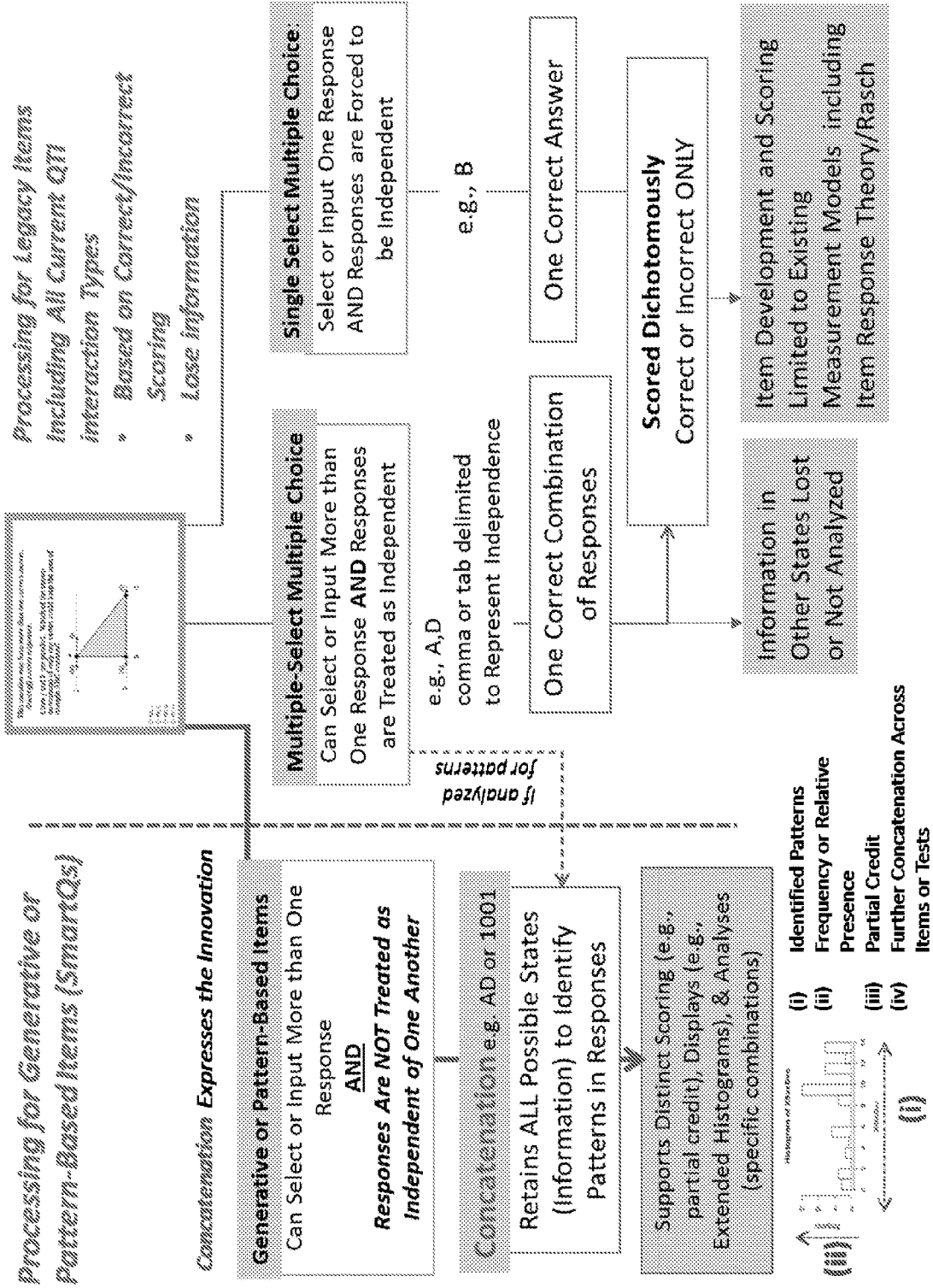
FIG. 41 shows a second non-limiting schematic diagram of dichotomous and non-dichotomous generative or pattern-based systems.

As seen in FIG. 40, current single select multiple choice 401 and multiple-select multiple choice tests 402 scored dichotomously, whereas only a correct or incorrect indication is stored. For the current single select multiple choice tests 401 the item comprises a series of two or more answer choices, wherein each answer choice is independent, and wherein only one student answer is able to be submitted and recorded by the test. As such, the current single select multiple choice tests 401 compare the answer choice to one correct response to determine whether or not the answer choice is correct. However, for the current single select multiple choice tests 401 item development and scoring is limited to existing measurement models such as item response theory. An exemplary scoring for the current single select multiple choice tests is shown in FIG. 42, wherein a single dichotomous item comprises four answer choices, and wherein each of the five students select only one student answer. As student 3 is the only student to select the correct answer of "B" they are the only person to receive a score for their answer.

Figure 43:
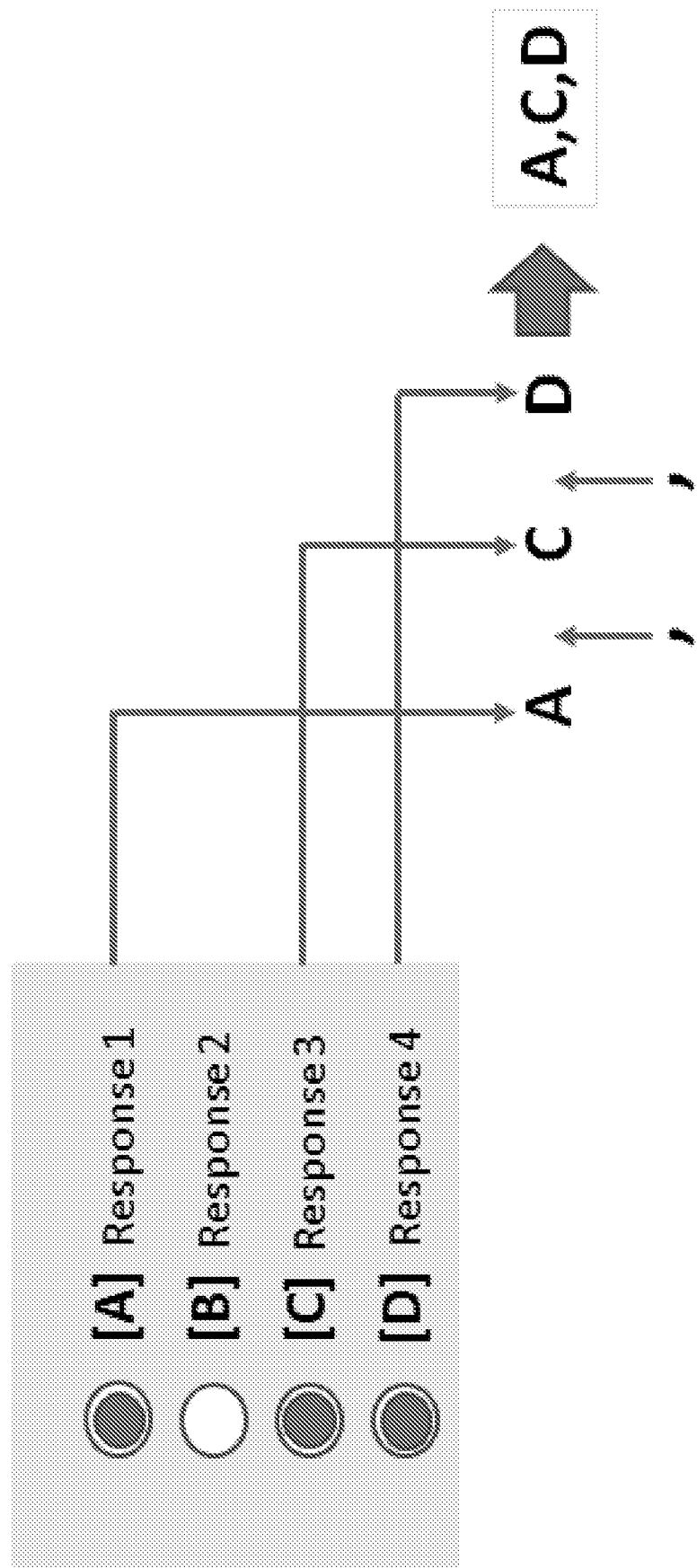
FIG. 43 shows a non-limiting first schematic diagram of a first current multiple-select multiple choice test.
Figure 44:
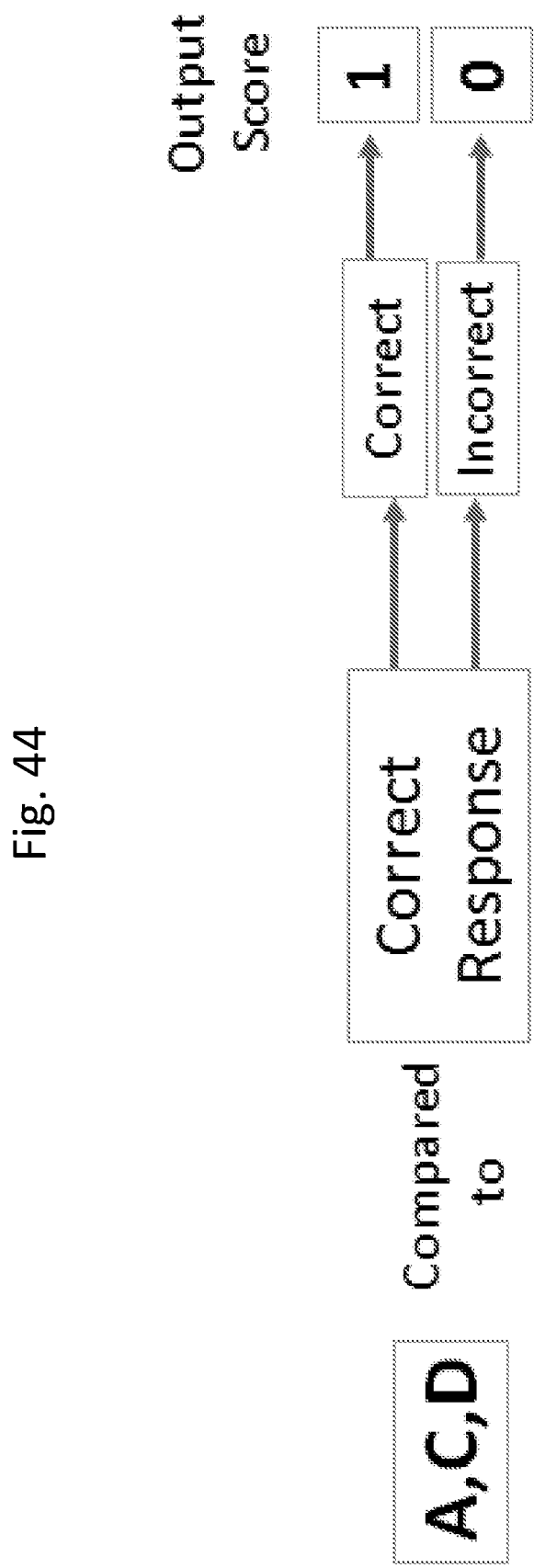
FIG. 44 shows a non-limiting second schematic diagram of a first current multiple-select multiple choice test.

For multiple-select multiple choice tests 402, a dichotomous item comprises a series of two or more answer choices, wherein one or more student answer are able to be submitted and recorded by the test, and wherein each answer choice is independent. As such, after being scored dichotomously, the current multiple select multiple choice tests 402 compare the answer choice or choices to one correct response to determine whether or not the answer choice or choices are correct. Thereafter, the answer choice or choices, the determination, or both are stored for each dichotomous item. However, for the current multiple select multiple choice tests 402 information in other states lost or not analyzed. An exemplary schematic diagram for a first current multiple select multiple choice tests is shown in FIG. 43, wherein a single dichotomous item comprises four answer choices, wherein the current multiple select multiple choice test 402 receives one student answer to each answer choice, and wherein each student answer comprises an answer selection. In the exemplary first schematic, student answers are stored regarding answer choices A, C, and D. As such, the current multiple select multiple choice test 402 adds a delimiter between each student answer and stores the response as "A, C, D." Per FIG. 44 the current multiple select multiple choice test 402 then compares the student answer to the correct response and assigns an output score depending on whether or not the student answers are correct. The current multiple select multiple choice test 402 then stores only the output scores and discards the original student answer(s).

FIG. 45A shows exemplary responses by 5 students test, whereas student answers for student 1 are temporarily stored regarding answer choices A, B, and C, whereas student answers for student 2 are temporarily stored regarding answer choices B and C, whereas student answers for student 3 are temporarily stored regarding answer choices A and D, whereas no student answers for student 4 are stored, and whereas student answers for student 5 are temporarily stored regarding answer choices C and D. As such, the answers are temporarily stored for students 1-5 as "A, B, C" "B, C" "A, D" " " and "C, D" respectfully with delimiters and immediately deleted after scoring. Per FIG. 45B each of the students are assigned a score whereas only student 2 receives a score of one for correctly submitting answer choices B and C. As shown, student 1's score does not represent that student 1 correctly selected answer choices B and C. In the case shown therein, with four answer choices there are 16 possible combinations of student answers and 16 possible bits of information, whereas only one bit of data regarding the student answers is stored. Such a loss of information prevents future analysis, correlations, and student answer recreation.

Figure 46:
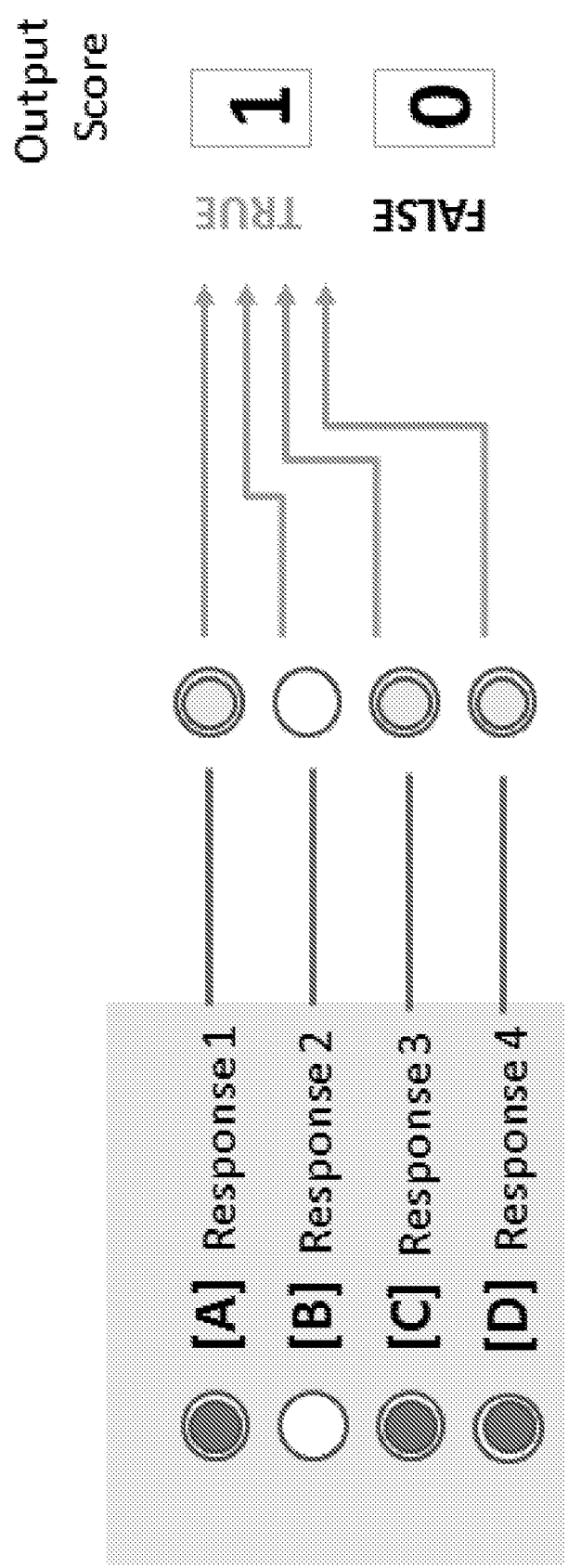
FIG. 46 shows a non-limiting schematic diagram of a second current multiple-select multiple choice test.

An exemplary schematic diagram for a second current multiple select multiple choice test is shown in FIG. 46, wherein a single dichotomous item comprises four answer choices, wherein the current multiple select multiple choice test 402 receives one student answer to each answer choice, and wherein the second current multiple select multiple choice test determines whether the student answer to each of the four answer choices is correct or not correct. The second current multiple select multiple choice test individual student answers are directly compared to a correct selection. The second current multiple select multiple choice test does not store the student answers, wherein such information is lost. In the case shown therein, with four answer choices there are 16 possible combinations of student answers and 16 possible bits of information, whereas only one bit of data regarding the student answers is stored. Such a loss of information prevents future analysis, correlations, and student answer recreation.

Figure 47:
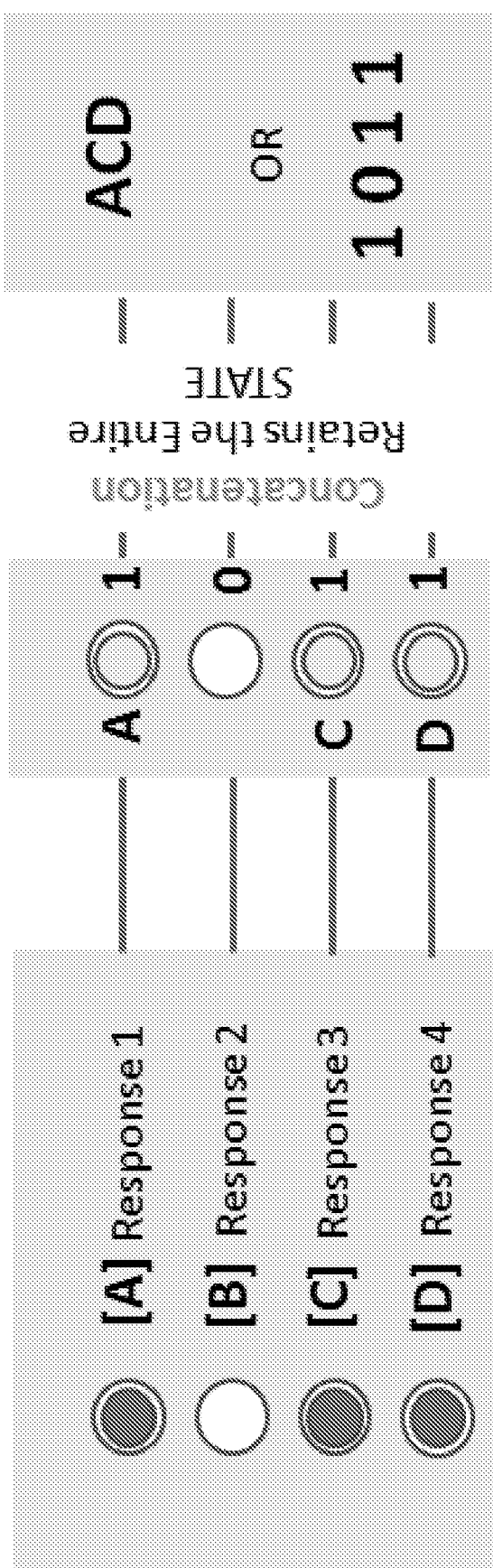
FIG. 47 shows a non-limiting schematic diagram of a non-dichotomous generative assessment system.

By contrast, per the pattern-based tests of FIG. 47 as disclosed herein, a non-limiting example of a non-dichotomous generative assessment item is provided. Here, the non-dichotomous generative assessment item comprises a series of two or more answer choices, wherein zero, one, or more student answer may be submitted and recorded by the test, and wherein each answer choice is not independent. In this particular example, 16 possible states exist (see, e.g., Table 1). As shown therein, answer choices of A, C, and D are represented as 1011. As such, after concatenation of the answer choices, the multiple select multiple choice test retains all possible states (information) to identify patterns in responses and supports distinct scoring (e.g., partial credit), enables the formation and display of answer choice histograms, and enables analyses of answer choice response combinations. In some embodiments, the pattern-based test does not use a delimiter. In some embodiments, the delimiter comprises a comma, a semicolon, a colon, a tab, a bracket, a parenthesis, a hashtag, a quotation mark, an asterisk, or any combination thereof. In some embodiments, the delimiter is not located between the two or more answer choices.

In one aspect, disclosed herein are computer-implemented methods for generative assessment item development, the method comprising: obtaining a released assessment item, wherein the released assessment item comprising a correct answer or a combination of correction answers; generating a question for the generative assessment item, wherein the question comprises information in the correct answer or the combination correction of answers of the released assessment item; and generating a plurality of responses to the question for the generative assessment item, wherein the plurality of responses comprises at least two responses that are not independent, and wherein the plurality of responses are non-dichotomous.

In another aspect, disclosed herein are computer-implemented methods for generative assessment item analysis, the method comprising: generating, by a computer, a plurality of responses to a question of the generative assessment item, wherein the plurality of responses comprises at least two responses that are not independent, and wherein the plurality of responses are non-dichotomous; and developing a set of rules for encoding the plurality of responses, wherein encoding of the plurality of responses generates a plurality of patterns, each pattern uniquely represent a response of the plurality of responses, wherein the plurality of patterns comprising: one or more first patterns representing baseline understanding of the question; one or more second patterns representing accurate understanding of the question; and one or more third patterns representing intermediate understanding of the question.

In yet another aspect, disclosed herein are computer-implemented methods for generative assessment item analysis, the method comprising: receiving, by a computer, a response to the generative assessment item from a user, wherein the response is selected by the user among a plurality of responses; encoding, by the computer, the response with a pre-determined set of rules thereby generating an encoded response, the encoded response comprising a pattern, wherein the pattern uniquely represents the response; and analyzing, by the computer, the pattern and a plurality of patterns, the plurality of patterns corresponding to at least a portion of the plurality of responses to the generative assessment item.

In some embodiments, the method further comprises receiving the response to the generative assessment item from the user in a group-based cloud computing system. In some embodiments, the generative assessment item is one or more of: a task, an assignment, an activity, a multiple choice question, and an order list question. In some embodiments, the generative assessment item is a non-dichotomous item. In some embodiments, when scored non-dichotomously, the plurality of responses contains at least 2×, 4×, 8×, or 16× information than scoring the plurality of responses dichotomously. In some embodiments, the method herein further comprises providing a generative assessment item to a user. In some embodiments, providing a generative assessment item to a user comprises presenting a generative assessment item in a group-based cloud computing system. In some embodiments, the group-based cloud computing system comprises: (a) a set of communications elements configured to provide a cloud network infrastructure; (b) an integrated array of representation tools; and (c) a plurality of collaborative activities deploying the set of communications elements and the integrated array of representation tools. In some embodiments, the group-based cloud computing system comprises a number of virtual classrooms, the number of virtual classrooms configured to work simultaneously and independently. In some embodiments, at least one of the numbers of virtual classrooms is author-able at a group activity level and at a learner level. In some embodiments, the method further comprises allowing the user to: create a coded object or behavior, post an image with embedded code in a gallery, select an object from the gallery to be added to the user's work space, or a combination thereof. In some embodiments, the method further comprises allowing the user or an activity author to select when and to whom a student space or a group-shared space is available. In some embodiments, the method further comprises allowing the user to turn on or off updates in the student space or the group-shared space. In some embodiments, the student space or the group-shared space is virtual space accessible by the user via a user interface. In some embodiments, the method further comprises allowing the user to code using one or more agent-based modeling languages. In some embodiments, the method further comprises combining an additional encoding with the encoded response to generate a second encoded response. In some embodiments, the additional encoding is based on information of the user. In some embodiments, the information of the user comprises demographical information. In some embodiments, the encoded response may include one or more number, letter, symbol, or a combination thereof. In some embodiments, analyzing the pattern and a plurality of patterns comprises generating a histogram of the pattern and the plurality of patterns. In some embodiments, the histogram indicates a frequency of occurrence of one or more responses among the plurality of responses based on the pattern and the plurality of patterns. In some embodiments, each of the plurality of responses is uniquely associated with a pre-determined pattern. In some embodiments, at least two among the response and the plurality of responses are not independent. In some embodiments, the pre-determined set of rules comprises one or more of: base-2 numbering rules, base-10 numbering rules, base-8 numbering rules, and base-16 numbering rules. In some embodiments, the generative assessment item is related to science, technology, engineering, and mathematics (STEM). In some embodiments, the generative assessment item is related to one or more of algebra, physics, geometry, pre-calculus, calculus, statistics, biology, chemistry, civil engineering, electronics, and architecture. In some embodiments, the generative assessment item is related to math, writing, history, reading, literature, science, art, music, foreign language, and social studies. In some embodiments, the generative assessment item is related to a level of learning for a kindergartener level, a first grade level, a second grade level, a third grade level, a fourth grade level, a fifth grade level, a sixth grade level, a seventh grade level, an eighth grade level, a ninth grade level, a tenth grade level, an eleventh grade level, a twelfth grade level, a college level, or post-graduate level.

In yet another aspect, disclose herein are computer-implemented systems for generative assessment item development, the system comprising: a digital processing device comprising: at least one processor, an operating system configured to perform executable instructions, a memory, and a computer program including instructions executable by the digital processing device to create an application comprising: a software module obtaining a released assessment item, wherein the released assessment item comprising a correct answer or a combination of correction answers; a software module generating a question for the generative assessment item, wherein the question comprises information in the correct answer or the combination correction of answers; and a software module generating a plurality of responses to the question for the generative assessment item, wherein the plurality of responses comprises at least two responses that are not independent, and wherein the plurality of responses are non-dichotomous.

In yet another aspect, disclose herein are computer-implemented systems for generative assessment item development, the system comprising: a digital processing device comprising: at least one processor, an operating system configured to perform executable instructions, a memory, and a computer program including instructions executable by the digital processing device to create an application comprising: a software module generating a plurality of responses to a question of the generative assessment item, wherein the plurality of responses comprises at least two responses that are not independent, and wherein the plurality of responses are non-dichotomous; and a software module developing a set of rules for encoding the plurality of responses, wherein encoding of the plurality of responses generates a plurality of patterns, each pattern uniquely represent a response of the plurality of responses, wherein the plurality of patterns comprising: one or more first patterns representing baseline understanding of the question; one or more second patterns representing accurate understanding of the question; and one or more third patterns representing intermediate understanding of the question.

In yet another aspect, disclose herein are computer-implemented systems for generative assessment item development, the system comprising: a digital processing device comprising: at least one processor, an operating system configured to perform executable instructions, a memory, and a computer program including instructions executable by the digital processing device to create an application comprising: a software module receiving a response to the generative assessment item from a user, wherein the response is selected by the user among a plurality of responses; a software module encoding the response with a pre-determined set of rules thereby generating an encoded response, the encoded response comprising a pattern, wherein the pattern uniquely represents the response; and a software module analyzing the pattern and a plurality of patterns, the plurality of patterns corresponding to at least a portion of the plurality of responses to the generative assessment item.

In some embodiments, the generative assessment item is one or more of: a task, an assignment, an activity, a multiple choice question, and an order list question. In some embodiments, the generative assessment item is a non-dichotomous item. In some embodiments, when scored non-dichotomously, the plurality of responses contains at least 2×, 4×, 8×, or 16× information than scoring the plurality of responses dichotomously. In some embodiments, the system herein further comprises a software module providing a generative assessment item to a user. In some embodiments, providing a generative assessment item to a user comprises presenting a generative assessment item in a group-based cloud computing system. In some embodiments, the system further comprises a software module receiving the response to the generative assessment item from the user in a group-based cloud computing system. In some embodiments, the group-based cloud computing system comprises: (a) a set of communications elements configured to provide a cloud network infrastructure; (b) an integrated array of representation tools; and (c) a plurality of collaborative activities deploying the set of communications elements and the integrated array of representation tools. In some embodiments, the group-based cloud computing system comprises a number of virtual classrooms, the number of virtual classrooms configured to work simultaneously and independently. In some embodiments, at least one of the number of virtual classrooms are author-able at a group activity level and at a learner level. In some embodiments, the system further comprises allowing the user to: create a coded object or behavior, post an image with embedded code in a gallery, select an object from the gallery to be added to the user's work space, or a combination thereof. In some embodiments, further comprises allowing the user or an activity author to select when and to whom a student space or a group-shared space is available. In some embodiments, the system further comprises allowing the user to turn on or off updates in the student space or the group-shared space. In some embodiments, the student space or the group-shared space is virtual space accessible by the user via a user interface. In some embodiments, the system further comprises allowing the user to code using one or more agent-based modeling languages. In some embodiments, the system further comprises a software module combining an additional encoding with the encoded response to generate a second encoded response. In some embodiments, the additional encoding is based on information of the user. In some embodiments, the information of the user comprises demographical information. In some embodiments, the encoded response may include one or more number, letter, symbol, or a combination thereof. In some embodiments, analyzing the pattern and a plurality of patterns comprises generating a histogram of the pattern and the plurality of patterns. In some embodiments, the histogram indicates a frequency of occurrence of one or more responses among the plurality of responses based on the pattern and the plurality of patterns. In some embodiments, each of the plurality of responses is uniquely associated with a pre-determined pattern. In some embodiments, at least two among the response and the plurality of responses are not independent. In some embodiments, the pre-determined set of rules comprises one or more of: base-2 numbering rules, base-10 numbering rules, base-8 numbering rules, and base-16 numbering rules. In some embodiments, the generative assessment item is related to science, technology, engineering, and mathematics (STEM). In some embodiments, the generative assessment item is related to one or more of algebra, physics, geometry, pre-calculus, calculus, statistics, biology, chemistry, civil engineering, electronics, and architecture. In some embodiments, the generative assessment item is related to math, writing, history, reading, literature, science, art, music, foreign language, and social studies. In some embodiments, the generative assessment item is related to a level of learning for a kindergartener level, a first grade level, a second grade level, a third grade level, a fourth grade level, a fifth grade level, a sixth grade level, a seventh grade level, an eighth grade level, a ninth grade level, a tenth grade level, an eleventh grade level, a twelfth grade level, a college level, or post-graduate level.

In yet another aspect, disclosed herein are non-transitory computer-readable storage media encoded with a computer program including instructions executable by a processor to create an application comprising: a software module obtaining a released assessment item, wherein the released assessment item comprising a correct answer or a combination of correction answers; a software module generating a question for the generative assessment item, wherein the question comprises information in the correct answer or the combination correction of answers; and a software module generating a plurality of responses to the question for the generative assessment item, wherein the plurality of responses comprises at least two responses that are not independent, and wherein the plurality of responses are non-dichotomous.

In yet another aspect, disclosed herein are non-transitory computer-readable storage media encoded with a computer program including instructions executable by a processor to create an application comprising: a software module generating a plurality of responses to a question of the generative assessment item, wherein the plurality of responses comprises at least two responses that are not independent, and wherein the plurality of responses are non-dichotomous; and a software module developing a set of rules for encoding the plurality of responses, wherein encoding of the plurality of responses generates a plurality of patterns, each pattern uniquely represent a response of the plurality of responses, wherein the plurality of patterns comprising: one or more first patterns representing baseline understanding of the question; one or more second patterns representing accurate understanding of the question; and one or more third patterns representing intermediate understanding of the question.

In yet another aspect, disclosed herein are non-transitory computer-readable storage media encoded with a computer program including instructions executable by a processor to create an application comprising: a software module receiving a response to the generative assessment item from a user, wherein the response is selected by the user among a plurality of responses; a software module encoding the response with a pre-determined set of rules thereby generating an encoded response, the encoded response comprising a pattern, wherein the pattern uniquely represents the response; and a software module analyzing the pattern and a plurality of patterns, the plurality of patterns corresponding to at least a portion of the plurality of responses to the generative assessment item.

In some embodiments, the generative assessment item is one or more of: a task, an assignment, an activity, a multiple choice question, and an order list question. In some embodiments, the generative assessment item is a non-dichotomous item. In some embodiments, when scored non-dichotomously, the plurality of responses contains at least 2×, 4×, 8×, or 16× information than scoring the plurality of responses dichotomously. In some embodiments, the media further comprises a software module providing a generative assessment item to a user. In some embodiments, a software module providing a generative assessment item to a user comprises presenting a generative assessment item in a group-based cloud computing system. In some embodiments, the media further comprises a software module receiving the response to the generative assessment item from the user in a group-based cloud computing system. In some embodiments, the group-based cloud computing system comprises: (a) a set of communications elements configured to provide a cloud network infrastructure; (b) an integrated array of representation tools; and (c) a plurality of collaborative activities deploying the set of communications elements and the integrated array of representation tools. In some embodiments, the group-based cloud computing system comprises a number of virtual classrooms, the number of virtual classrooms configured to work simultaneously and independently. In some embodiments, at least one of the number of virtual classrooms are author-able at a group activity level and at a learner level. In some embodiments, the media further comprises allowing the user to: create a coded object or behavior, post an image with embedded code in a gallery, select an object from the gallery to be added to the user's work space, or a combination thereof. In some embodiments, the media further comprises allowing the user or an activity author to select when and to whom a student space or a group-shared space is available. In some embodiments, the media further comprises allowing the user to turn on or off updates in the student space or the group-shared space. In some embodiments, the student space or the group-shared space is virtual space accessible by the user via a user interface. In some embodiments, the media further comprising allowing the user to code using one or more agent-based modeling languages. In some embodiments, the additional encoding is based on information of the user. In some embodiments, the information of the user comprises demographical information. In some embodiments, the encoded response may include one or more number, letter, symbol, or a combination thereof. In some embodiments, analyzing the pattern and a plurality of patterns comprises generating a histogram of the pattern and the plurality of patterns. In some embodiments, the histogram indicates a frequency of occurrence of one or more responses among the plurality of responses based on the pattern and the plurality of patterns. In some embodiments, each of the plurality of responses is uniquely associated with a pre-determined pattern. In some embodiments, at least two among the response and the plurality of responses are not independent. In some embodiments, the pre-determined set of rules comprises one or more of: base-2 numbering rules, base-10 numbering rules, base-8 numbering rules, and base-16 numbering rules. In some embodiments, the generative assessment item is related to science, technology, engineering, and mathematics (STEM). In some embodiments, the generative assessment item is related to one or more of algebra, physics, geometry, pre-calculus, calculus, statistics, biology, chemistry, civil engineering, electronics, and architecture. In some embodiments, the generative assessment item is related to math, writing, history, reading, literature, science, art, music, foreign language, and social studies. In some embodiments, the generative assessment item is related to a level of learning for a kindergartener level, a first grade level, a second grade level, a third grade level, a fourth grade level, a fifth grade level, a sixth grade level, a seventh grade level, an eighth grade level, a ninth grade level, a tenth grade level, an eleventh grade level, a twelfth grade level, a college level, or post-graduate level.

Generative Assessment Items

Disclosed herein are items for education purposes. In some embodiments, items are tasks, activities, or assignments to which a user responds for the purposes of assessment. Items can include tasks, activities or assignments where users selects from among a given set of responses (e.g., a multiple choice question, or an order list question), where users generate a response or collection of responses that can be directly encoded or categorized, where users respond with gestures or sequences of gestures that can be encoded or categorized and/or where the users responses or set of responses need to be parsed or otherwise analyzed prior to being encoded or categorized (e.g., graph sketched by a user is first parsed into piecewise elements based on curvature prior to being further encoded and analyzed; or text parsed in terms of active and passive verb tenses or use of specific vocabulary). In some embodiments, the response of a user to a generative assessment item may include one or more alternatives provided as solutions to the stem of the item. For example, a user may provide a response of (a) and (c) to a multiple choice question, while another user may provide (b) to the same multiple choice question.

In some embodiments, the systems, methods, and items described herein is implemented or made accessible in online open source platforms or environment. In some embodiments, the systems, methods, and items disclosed herein are compatible with the IMS Question & Test Interoperability (QTI®) specification, thus enabling the exchange of items, test contents, and/or results data between the systems and methods herein with authoring tools, item banks, test construction tools, learning platforms, assessment delivery systems, and scoring/analytics engines.

In some embodiments, items herein include one or more of questions based on one or more QTI interaction types. In some embodiments, the items herein includes a set of interactions (possibly empty) collected together with any supporting material and an optional set of rules for converting the user's response(s) into assessment outcomes. In some embodiments, the set of interactions includes one or more QTI interactions. Nonlimiting examples of QTI interactions include: ChoiceInteraction, OrderInteraction, ExtendedTextInteraction, TextEntryInteraction, GraphicGapMatchInteraction, GapMatchInteraction, HottextInteraction, InlineChoiceInteraction, MatchInteraction, OrderInteraction, TextEntryInteraction, and HotspotInteraction. As an example, an item herein can be a multiple choice question that includes at least one type of QTI interaction, i.e., ChoiceInteraction. As another example, an item can be an order list which includes at least one other type of QTI interaction, i.e., OrderInteraction. Nonlimiting examples of items include: a multiple choice question, an order list question (e.g., order the events, chronologically earliest to latest, list: Russian Revolution, Discovery of the Americas, and Storming of the Bastille), a long text question (e.g., write about their hobbies in no more than 400 words), a doze association question (e.g., choose the correct response for each blank.).

Disclosed herein, in some embodiments are generative assessment items. In some embodiments, generative assessment items are non-dichotomously coded items where each of the responses or combinations of responses, encodings, or categorizations represents a unique state, with possibly unique significance and interpretation. Rather than being limited to two only two states, as is the case with dichotomously coded items, a generative assessment item with same number of multiple choice alternatives, e.g., (a)-(d), can have, in some examples, sixteen coded states, or eight times as much information as a dichotomously coded item. In some embodiments, the individual responses or combination of responses within a generative assessment item are no longer treated as independent (e.g., as simple, separate, true/false-like sub-items). In some embodiments, this indicate that for a given non-dichotomously coded multiple choice item the selection of response "b" might tell an educator or a teach something different when paired with "c" than it does when paired with "d". In some embodiments, an item coded in a way that renders the multiple possible states, or treats the individual responses or combinations of responses as not independent, is a generative assessment item.

Encoding

In some embodiments, a set of rules may be utilized to generate encoded responses from one or more responses. In some embodiments, the encoded response comprises a pattern which can uniquely represent the response. In some embodiments, each of the plurality of responses is uniquely associated with a pre-determined pattern. In some embodiments, the encoded response may include one or more number, letter, symbol, or a combination thereof. In some embodiments, one or more patterns represent baseline understanding of the question; one or more other patterns represent accurate understanding of the question; and one or more patterns represent intermediate understanding of the question in between the baseline and the accurate understanding.

In some embodiments, when a response from a user is received, the response and many other responses from other user may be analyzed together. In some embodiments, an encoded response may include an additional encoding based on information of the user. In some embodiments, the information of the user comprises demographical information.

A non-limiting exemplary way of encoding and representing the multiple states or responses of a generative assessment item can include, but not be limited to, representing each of the responses selected with 1 and each of the responses not selected with a 0. For example, for a multiple choice question with 4 different choices, the selection of letters (a), (c) and (d), but not (b), can be represented by 1, 0, 1, 1. This sequence of 1's and 0's can be concatenated to create a binary number 1011. In this way, each of the 16 possible responses or states (of a typical multiple choice) can be represented by a unique four digit binary number. For example:

TABLE 1

| Response | Binary |
| --- | --- |
| — | 0000 |
| A | 1000 |
| B | 0100 |
| C | 0010 |
| D | 0001 |
| AB | 1100 |
| AC | 1010 |
| AD | 1001 |

TABLE 1-continued

| Response | Binary |
| --- | --- |
| BC | 0110 |
| BD | 0101 |
| CD | 0011 |
| ABC | 1110 |
| ABD | 1101 |
| ACD | 1011 |
| BCD | 0111 |
| ABCD | 1111 |

In some embodiments, a set of rules, such as binary representations can be converted to other base systems, including base sixteen (hexadecimal) or base ten (decimal) representations (e.g., 1011 [binary], B [hexadecimal], or 11 [decimal]). As another example, for an order list question, four elements to order can have 24 response states. The 24 responses may be represented using a sequence of 1's and 0's to create a binary number that can analyzed for patterns. Alternatively, the 24 responses may be represented using histograms. In some embodiments, the first binary number is 1 and the second binary number is 0. In some embodiments, the first binary number is 0 and the second binary number is 1. In some embodiments, each of the two or more answer choices is not independent from each other.

In some embodiments, patterns of response can be analyzed. In some embodiments, analysis of the pattern and a plurality of other patterns comprise generating a histogram of the pattern and the plurality of patterns. Such histogram can indicate a frequency of occurrence of one or more patterns corresponding to responses.

Figure 1:
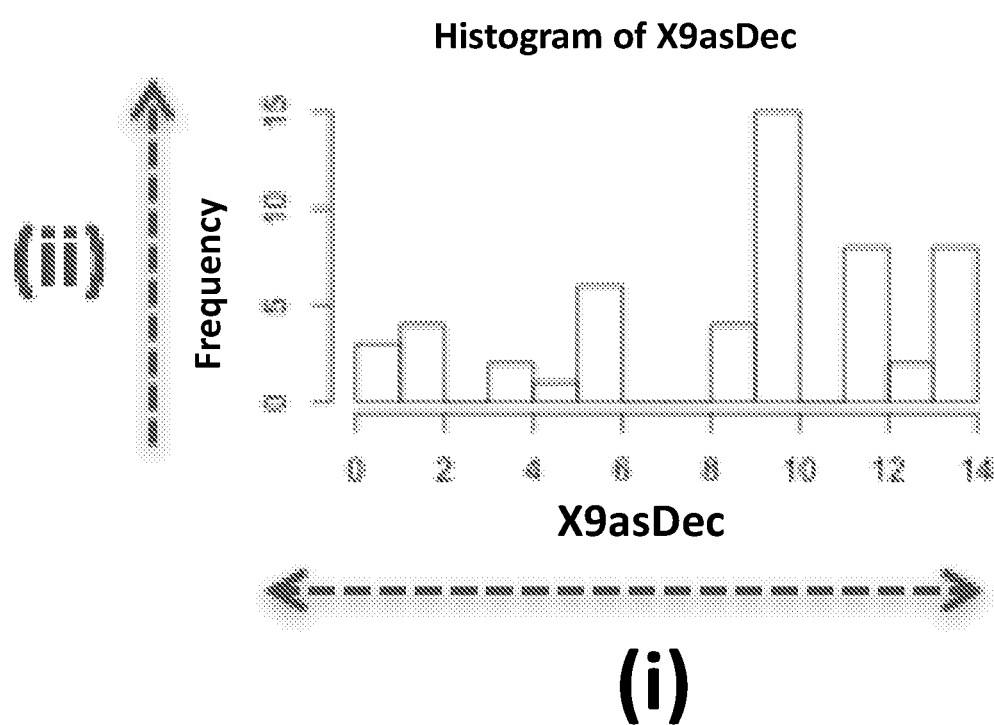
FIG. 1 shows a non-limiting exemplary histogram of frequency of responses for patterns for a given generative assessment item.
Figure 2:
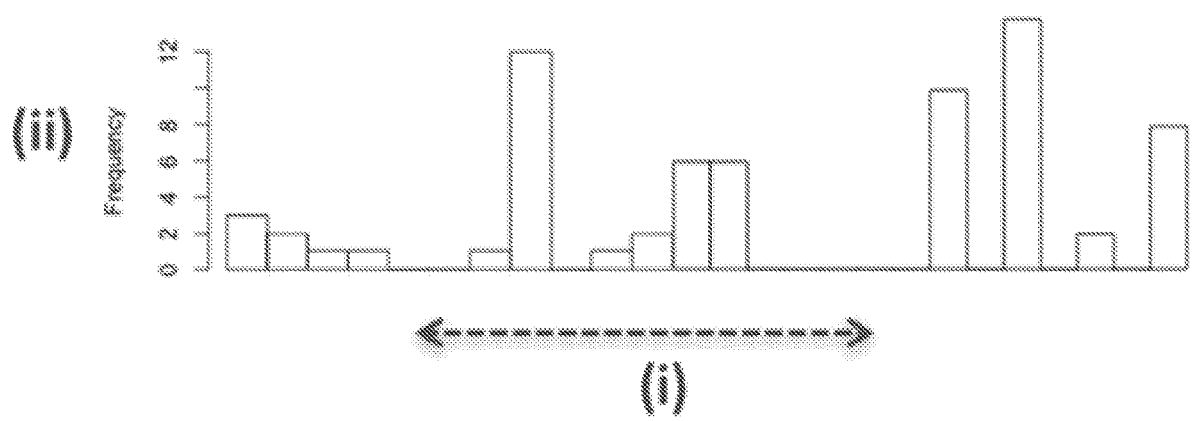
FIG. 2 shows a non-limiting exemplary histogram of frequency of responses for patterns across multiple generative assessment items.
Figure 15:
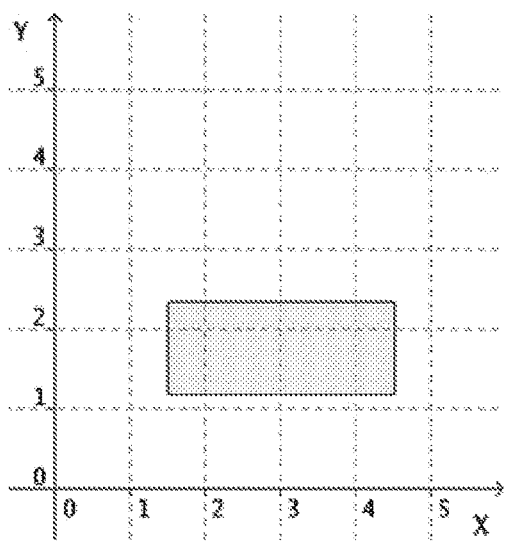
FIG. 15 shows a thirteenth non-limiting examples of a generative assessment item.
Figure 20:
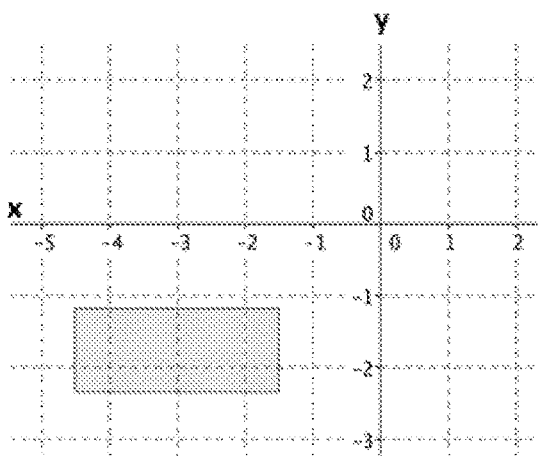
FIG. 20 shows a eighteenth non-limiting examples of a generative assessment item.
Figure 22:
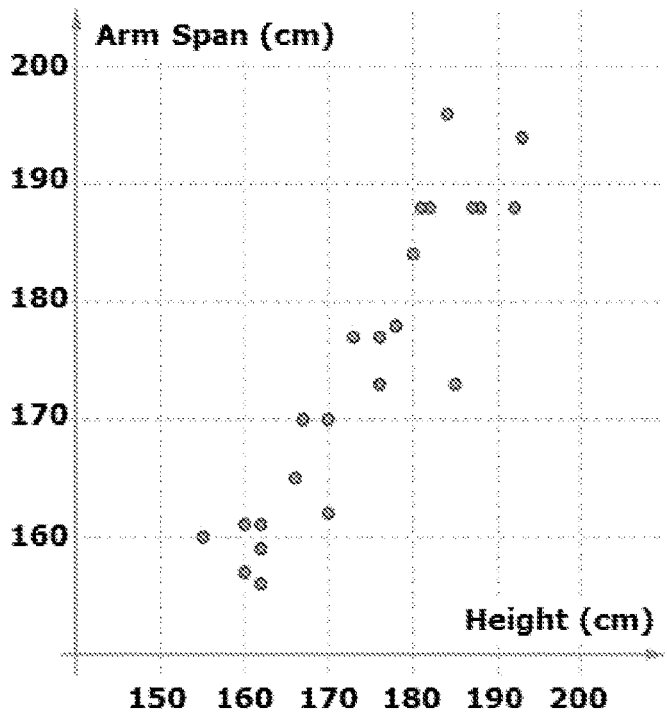
FIG. 22 shows a twentieth non-limiting examples of a generative assessment item.
Figure 25:
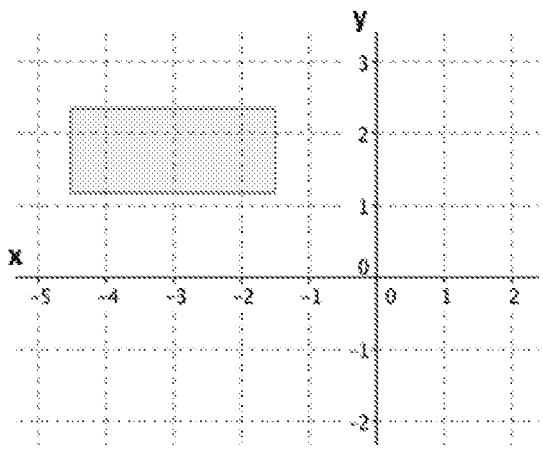
FIG. 25 shows a twenty-third non-limiting examples of a generative assessment item.
Figure 28:
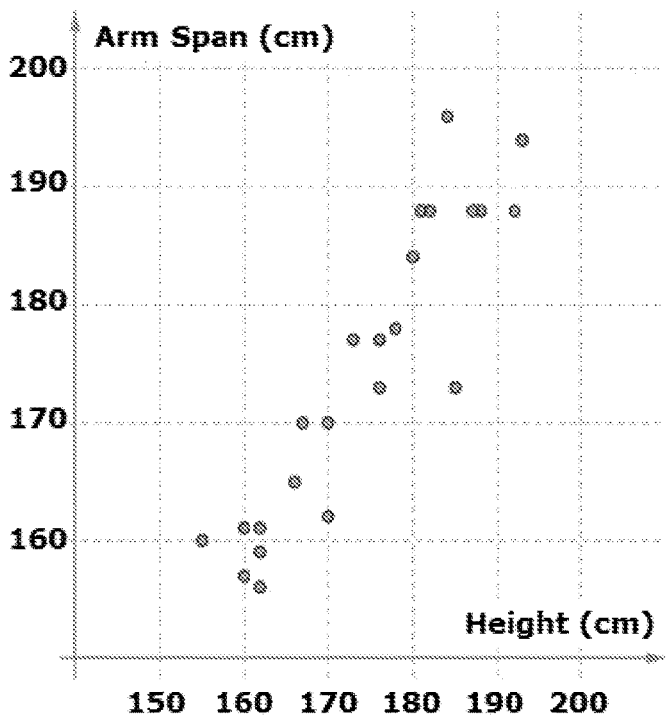
FIG. 28 shows a twenty-sixth non-limiting examples of a generative assessment item.
Figure 32:
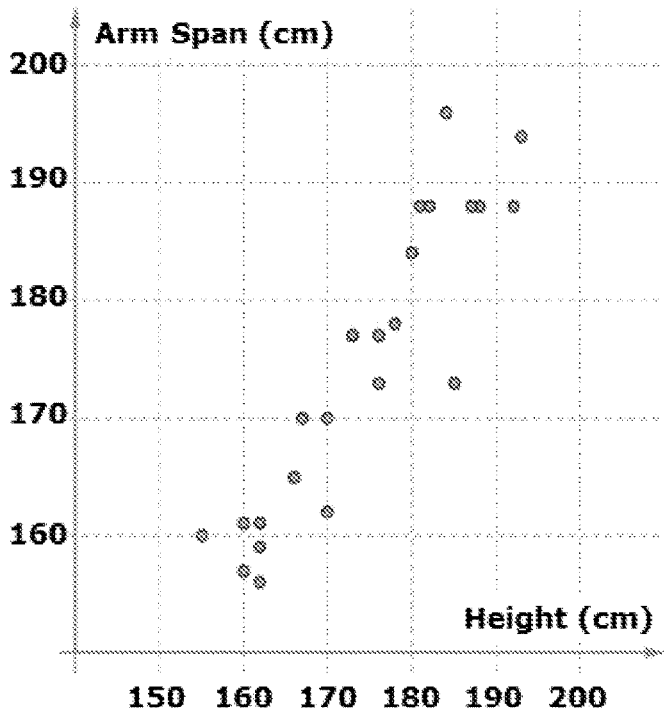
FIG. 32 shows a thirtieth non-limiting examples of a generative assessment item.
Figure 34:
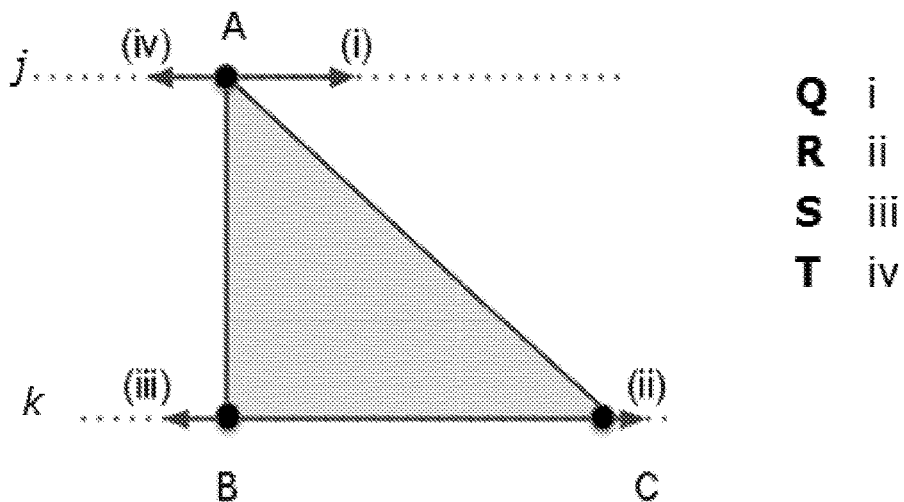
FIG. 34 shows a thirty-second non-limiting examples of a generative assessment item.
Figure 35:
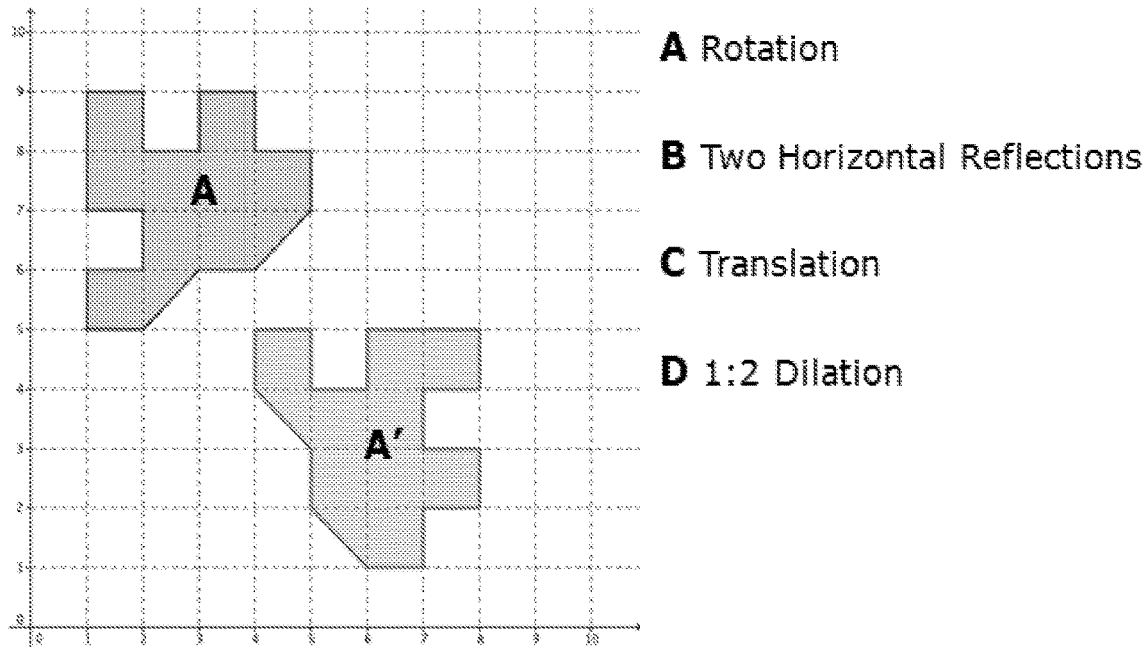
FIG. 35 shows a thirty-third non-limiting examples of a generative assessment item.

As illustrated in FIG. 1, for a multiple choice, a histogram can be used to display the relative frequencies along axis (ii) of the respective patterns, which is on axis (i). FIG. 2 shows a different histogram that can be used visualize relative frequency (axis (ii)) of the patterns (axis (i)) across multiple generative assessment items. In these two particular embodiments, of particular importance in terms of their value for educational purposes are the patterns, or responses, that occur most frequently (or the most significant modes) both within a given item (FIG. 1) or across items (FIG. 2). In some embodiments, encoding responses into unique patterns may facilitate identification of patterns, thus response, capable of informing education related activities including instructional responses. In some embodiments, analysis tools such as histograms can facilitate identification of patterns that are informative for educational purposes.

In some embodiments, the encoded responses or patterns are compatible with the current state of art. In some embodiments, systems and methods herein allow the encoded responses or patterns to be analyzed as traditional dichotomous items to provide additional information.

Concatenation

FIG. 48 shows a non-limiting table displaying two examples of current scoring concatenation. In the first example as shown, a student answer is provided to a first non-dichotomous generative assessment item, and not a second non-dichotomous generative assessment item. In the second example as shown, a student answer is provided to a second non-dichotomous generative assessment item, and not a first non-dichotomous generative assessment item. As shown the first concatenated response is stored as "A, B" and the second concatenated response is also stored as "A, B." As such, current scoring concatenation methods are ambiguous, whereas data regarding which student answers were provided to which non-dichotomous generative assessment item is not recorded and/or lost. While current scoring concatenation methods can further include additional delimiters, or other identification characters, such means only increase the amount of memory required to store the student answers.

Further examples of the ambiguity inherent to exemplary current scoring concatenations are shown in FIGS. 49A-C. Per FIG. 49A a student answer of (ABC) to a first non-dichotomous generative assessment item and a student answer of (D) are concatenated as "ABCD." The concatenation therein is ambiguous as "ABCD" can represent student answers to 1, 2, 3 4, or more non-dichotomous generative assessment items. For example "ABCD" represent a single student answer of "ABCD" to a single item. Alternatively "ABCD" can represent student answers (ABC)-(D), (AB)-(CD), or (A)-(BCD) to two items. Further "ABCD" can represent student answers (A)-(BC)-(D), (A)-(B)-(CD), or (AB)-(C)-(D) to three items. In addition, "ABCD" can represent student answer (A)-(B)-(C)-(D) to four items. Such ambiguity reduces the ability of the student answers to be used towards machine learning and machine learning training. Although some current scoring concatenations per FIGS. 49B-C employ delimiters between each student answer, the added delimiters increase the amount of bits required to store the student answers, and are further ambiguous regarding how many items are represented by the student answers. In some embodiments, the delimiter comprises a comma, a semicolon, a colon, a tab, a bracket, a parenthesis, a hashtag, a quotation mark, an asterisk, or any combination thereof. In some embodiments, the delimiter is not located between the two or more answer choices. Moreover, delimiter placement may lend itself to computer processing error.

By contrast, the exemplary student answer scoring concatenation as provided herein, per FIG. 50, represents student answers to a first non-dichotomous generative assessment item having four answer choices as a first four digit binary number and represents student answers to a second non-dichotomous generative assessment item having four answer choices as a second four digit binary number. As such, concatenating the student answers to the first and second non-dichotomous generative assessment items yields a concatenated answer that is 8 binary digits long and which is not ambiguous. In some embodiments, a size of the concatenated answer is equal to AC bits, wherein AC equals the number of answer choices. In some embodiments, the concatenated answer is not ambiguous.

In some embodiments, the prompt module further displays two or more non-dichotomous generative assessment items, wherein the recording module further receives the student answer to each answer choice for each of the two or more non-dichotomous generative assessment items. In some embodiments, the storage module further stores the received student answer to each answer choice in the series for each of the two or more non-dichotomous generative assessment items, in the binary format, wherein the concatenation module, further concatenating every concatenated answer for each of the two or more non-dichotomous generative assessment items to form a multiple item concatenated answer. As such, per FIG. 51A the exemplary student answer scoring concatenation concatenates student answers to each of five non-dichotomous generative assessment items to form a multiple item concatenated answer. In some embodiments, the two or more non-dichotomous generative assessment items comprise 3, 4, 5, 6, 7, 8, 9, 10, 20, 30, 40, 50, 60 or more non-dichotomous generative assessment items. In some embodiments, a size of the multiple item concatenated answer is equal to AC*Q bits, and wherein AC equals a number of answer choices, and wherein Q equals a number of non-dichotomous generative assessment items. In some embodiments, the multiple item concatenated answer is not ambiguous. In some embodiments, the plurality of non-dichotomous generative assessment items is disposed sequentially in a student test. In some embodiments, the plurality of non-dichotomous generative assessment items is disposed randomly throughout a student test in a non-sequential manner. the plurality of non-dichotomous generative assessment items is disposed sequentially in a student test. In some embodiments, the plurality of non-dichotomous generative assessment items is disposed across multiple exams (e.g., first non-dichotomous generative assessment item provided as Question No. 1 for Student 1 on Jan. 1, 2019 and the second non-generative assessment item provided as Question No. 1 for Student 1 on Jul. 1, 2019).

In some embodiments, the prompt module further displays the non-dichotomous generative assessment item to two or more students; the recording module further receives the student answer to each answer choice in the series for each of the two or more students; the storage module, further stores the received student answer to each answer choice for each of the two or more students, in a binary format; and the concatenation module, further concatenating every concatenated answer for each of the two or more students to form a multiple student concatenated answer. Per FIG. 51B the exemplary student answer scoring concatenation concatenates student answers to a single non-dichotomous generative assessment item from multiple students to form a multiple student concatenated answer. In some embodiments, the two or more students comprise 3, 4, 5, 6, 7, 8, 9, 10, 20, 30, 40, 50, 60 or more students. In some embodiments, a size of the multiple student concatenated answer is equal to AC*S bits, and wherein AC equals a number of answer choices, and wherein S equals a number of students. In some embodiments, the multiple student concatenated answer is not ambiguous. In some embodiments, student answers to non-dichotomous generative assessment items are received at different times wherein, for example, a first student answer is received on a first day to non-dichotomous generative assessment item proctored on the first day, and wherein a second student answer is received on a second day to non-dichotomous generative assessment item proctored on the second day.

Finally, per FIG. 52 the exemplary student answer scoring concatenation concatenates student answers to three non-dichotomous generative assessment item from three students to form a multiple student multiple item concatenated answer.

Generative Assessment Item Development

Disclosed herein includes systems and methods for generative assessment item development comprising one or more of: obtaining a released assessment item which comprises correct answer(s); generating a question for the generative assessment item using information from the correct answer(s) of the released assessment item; and generating a plurality of responses to the question for the generative assessment item, wherein the plurality of responses comprises at least two responses that are not independent, and wherein the plurality of responses are non-dichotomous. In some embodiments, the released assessment item is a non-dichotomous or dichotomous item.

In some embodiments, for generation of an assessment item for a grade level, the indicated grade-level Texas Essential Knowledge and Skills (TEKS) may be considered.

In some embodiments, the connections to the core mathematical ideas and standards for the released item are identified. In some embodiments, such identification is performed automatically by a computer. In some embodiments, computer software, algorithm, or the like is used for such identification. In further embodiments, a machine learning algorithm, artificial intelligence algorithm, a regression model, a classifier, a deep learning algorithm or a combination is used.

In some embodiments, a generative assessment item is generated based on release items, the released items being dichotomous items, generative assessment items, or a combination thereof. In some embodiments, a generative assessment item is generated automatically by a computer. In some embodiments, computer software, algorithm, or the like is used for such generation of generative assessment items. In further embodiments, a machine learning algorithm, artificial intelligence algorithm, a regression model, a classifier, a deep learning algorithm or a combination is used.

In some embodiments, the concatenated answer is converted to a vector format. In some embodiments, the concatenated answer is converted to a vector format by the following algorithm:

```
Code and Vector Results:
    fool <- function(str1){ as.integer(unlist(strsplit(str1, ""))) }
    res <- fool("1110001")
    res #[1] 1 1 1 0 0 0 1
```

In some embodiments, the concatenated answer in the vector format is used directly or indirectly to train a machine learning algorithm. In some embodiments, the concatenated answer in the vector format is used directly or indirectly to perform a machine learning algorithm. In some embodiments, the machine learning algorithm detects a certain class of students according to their answer selections.

In some embodiments, the application further comprises a blockchain module, storing the concatenated answer in an immutable data storage. In some embodiments, the application further comprises a histogram module forming a histogram from the concatenated answer. Exemplary histograms are shown in FIGS. 1 and 2. In some embodiments, the histogram comprises a histogram of the possible combinations of answer choices.

In some embodiments, the development of the item including asking the question "backward" which can include "making the answer to a right/wrong task the question." For example, instead of asking, "What is 2+2?" We can make the answer, '4', into 'the question' by asking students to create expressions that sum to 4. Instances of what students might do or create then become candidates for responses to the item. In this example, 1+3, 0+4 can become candidates in addition to 2+2.

In some embodiments, the possible answers, optionally generated by a computer, or real responses from students can be used to form responses to the item. In some embodiments, the complete set of response includes at least one or more real responses which are the ones that may convey important information about student understanding of the topic. In some embodiments, the possible answers or real answers can include both correct and incorrect responses. In some embodiments, 4, 5, 6, 7, or even more alternatives for a given item are chosen. In the case of 4 alternatives, 16 different and possibly unique responses can be formed.

In some embodiments, an items is designed to have some alternatives that nearly all students are expected to get correct. In some embodiments, these alternatives identify a 'baseline' understanding. In some embodiments, there are alternatives up from this baseline that is expected to be of greater difficulty. The combination of alternatives that is an 'exact match' with the intended combination is often significantly more difficult than the intended baseline responses. In some embodiments, depth of understanding within and across items can be assessed. In some embodiments, with the generative assessment item developed or analyzed using the systems and methods herein, patterns of simply guessing or fragmented understanding can be identified and can serve to identify students for additional support or intervention.

In some embodiments, the items are generated using the specific norms, word choices, fonts and other features of item layout used on released items from which the items are based upon.

Analysis

In some embodiments, the increased information provided by non-dichotomous generative assessment items (multiple choice-multiple answer) disclosed herein advantageously opens up a wide range of possible ways of reporting and scoring results with related tradeoffs in transparency and technical demand.

In some embodiments, one of the analysis or evaluation method disclosed herein include scoring percent correct. For individual items, combinations of items or for tests using at least some non-dichotomous items as a whole, a simple reporting of percent correct relative to the intended responses can be transparent and accessible to users. In some embodiments, such percent correct score can be indicative of how the child/students/school/district does relative to relevant reported averages. In some embodiment, such percent correct is meaningful and useful to nearly all stakeholders in the education system.

In some embodiments, one of the analysis or evaluation method disclosed herein include scaling and equating. Percent correct on anchor items can be used to scale scores. In some embodiments, dichotomous item response theory (IRT)-based methods (of various levels of sophistication) remain available. The IRT based methods may be done in ways consistent with existing industry standards for multiple-select multiple choice items or can be based on innovations related to polytomous analyses.

In some embodiments, one of the analysis or evaluation method disclosed herein include pattern identification. In some embodiments, meaningful patterns in student responses are identified using the methods and systems herein. In some embodiments, the patterns in responses are of great use to professional educators (starting with teachers); helpful in research on learning and teaching, and capable of informing decisions about materials selection and 'best practices' for educating students.

Disclosed herein, in some embodiments, the development of generative assessment items is closely associated with tasks that have been, or could be, used in classrooms. In some embodiments, items are best developed based on experiences from educators who have a sophisticated understanding of the learning and teaching issues and opportunities relative to specific standards and of students at a given grade level.

To the extent that generative assessment items are successful in identifying meaningful patterns in student responses, in some embodiments, they provide a natural connection to professional development in interpreting and acting on assessment results.

Group-Based Cloud Computing

Disclosed herein, in certain embodiments, are group-based cloud computing (GBCC) systems. In some embodiments, a generative assessment item is provided to a user in a group-based cloud computing system. In some embodiments, the systems and methods herein includes receiving the response to the generative assessment item from the user in a group-based cloud computing system.

In some embodiments, the group-based cloud computing system comprises: (a) a set of communications elements configured to provide a cloud network infrastructure; (b) an integrated array of representation tools; and (c) a plurality of collaborative activities deploying the set of communications elements and the integrated array of representation tools. In some embodiments, the group-based cloud computing system comprises a number of virtual classrooms, the number of virtual classrooms configured to work simultaneously and independently. In some embodiments, one or more of the virtual classrooms are author-able at a group activity level and at a learner level.

In some embodiments, the group-based cloud computing system herein allows the user to: create a coded object or behavior, post an image with embedded code in a gallery, select an object from the gallery to be added to the user's work space, or a combination thereof.

In some embodiments, the group-based cloud computing system herein allows the user or an activity author to select when and to whom a student space or a group-shared space is available.

In some embodiments, the group-based cloud computing system herein allows the user to turn on or off updates in the student space or the group-shared space, wherein the student space or the group-shared space is virtual space accessible by the user via a user interface.

In some embodiments, the group-based cloud computing system herein allows the user to code using one or more agent-based modeling languages.

Digital Processing Device

In some embodiments, the systems, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 37:
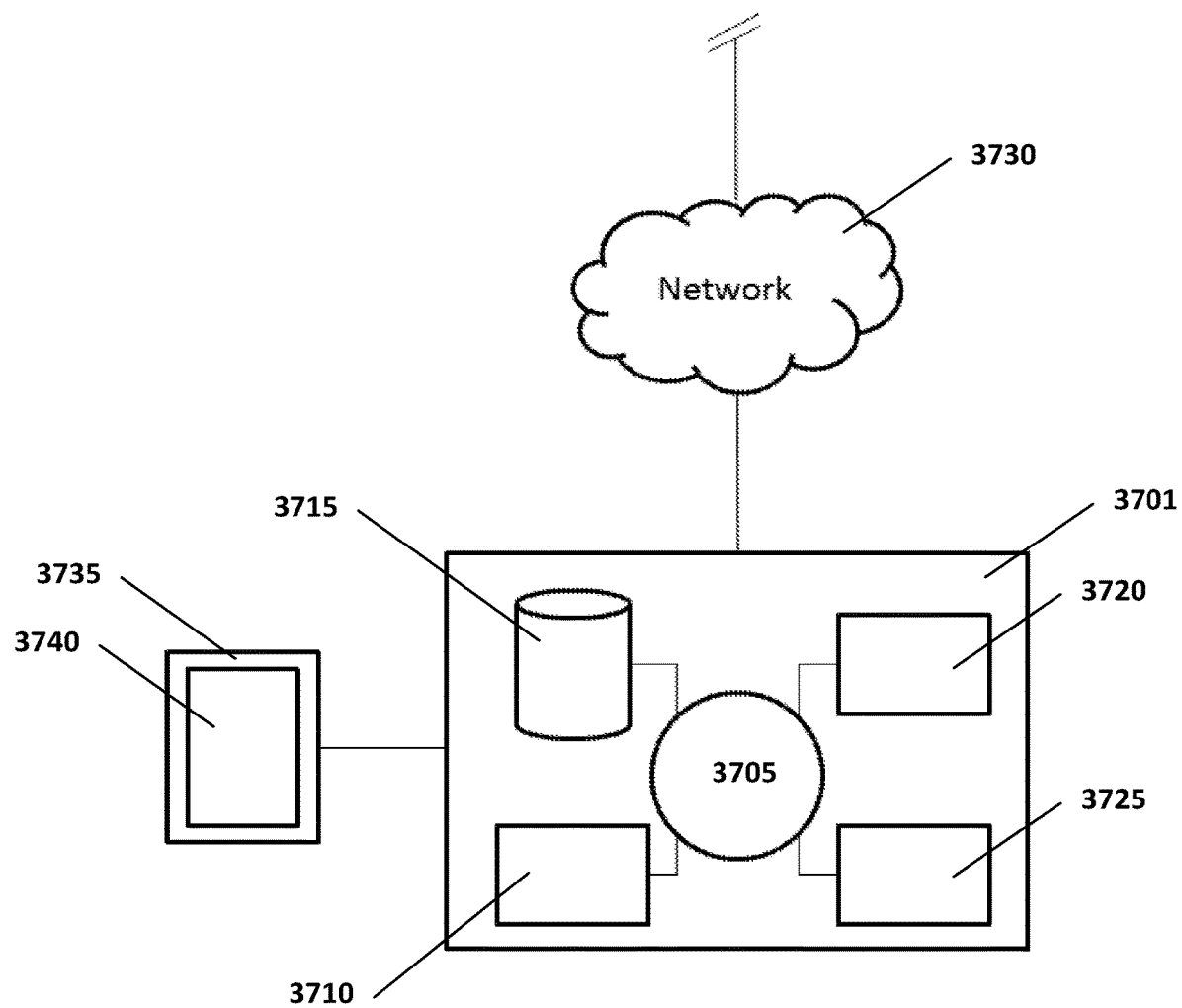
FIG. 37 shows a non-limiting schematic diagram of a digital processing device; in this case, a device with one or more CPUs, a memory, a communication interface, and a display.

Referring to FIG. 37, in a particular embodiment, an exemplary digital processing device 3701. The device 3701 can regulate various aspects of the present disclosure, such as, for example, generative item development, analysis, encoding, and pattern recognition. In this embodiment, the digital processing device 3701 includes a central processing unit (CPU, also "processor" and "computer processor" herein) 3705, which can be a single core or multi core processor, or a plurality of processors for parallel processing. The digital processing device 3701 also includes memory or memory location 3710 (e.g., random-access memory, read-only memory, flash memory), electronic storage unit 3715 (e.g., hard disk), communication interface 3720 (e.g., network adapter) for communicating with one or more other systems, and peripheral devices 3725, such as cache, other memory, data storage and/or electronic display adapters. The memory 3710, storage unit 3715, interface 3720 and peripheral devices 3725 are in communication with the CPU 3705 through a communication bus (solid lines), such as a motherboard. The storage unit 3715 can be a data storage unit (or data repository) for storing data. The digital processing device 3701 can be operatively coupled to a computer network ("network") 3730 with the aid of the communication interface 3720. The network 3730 can be the Internet, an internet and/or extranet, or an intranet and/or extranet that is in communication with the Internet. The network 3730 in some cases is a telecommunication and/or data network. The network 3730 can include one or more computer servers, which can enable distributed computing, such as cloud computing. The network 3730, in some cases with the aid of the device 3701, can implement a peer-to-peer network, which may enable devices coupled to the device 3701 to behave as a client or a server.

Continuing to refer to FIG. 37, the CPU 3705 can execute a sequence of machine-readable instructions, which can be embodied in a program or software. The instructions may be stored in a memory location, such as the memory 3710. The instructions can be directed to the CPU 3705, which can subsequently program or otherwise configure the CPU 3705 to implement methods of the present disclosure. Examples of operations performed by the CPU 3705 can include fetch, decode, execute, and write back. The CPU 3705 can be part of a circuit, such as an integrated circuit. One or more other components of the device 3701 can be included in the circuit. In some cases, the circuit is an application specific integrated circuit (ASIC) or a field programmable gate array (FPGA).

Continuing to refer to FIG. 37, the storage unit 3715 can store files, such as drivers, libraries and saved programs. The storage unit 3715 can store user data, e.g., user preferences and user programs. The digital processing device 3701 in some cases can include one or more additional data storage units that are external, such as located on a remote server that is in communication through an intranet or the Internet.

Continuing to refer to FIG. 37, the digital processing device 3701 can communicate with one or more remote computer systems through the network 3730. For instance, the device 3701 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 3701, such as, for example, on the memory 3710 or electronic storage unit 3715. The machine executable or machine readable code can be provided in the form of software. During use, the code can be executed by the processor 3705. In some cases, the code can be retrieved from the storage unit 3715 and stored on the memory 3710 for ready access by the processor 3705. In some situations, the electronic storage unit 3715 can be precluded, and machine-executable instructions are stored on memory 3710.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™ JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft Silverlight®, Java™, and Unity®.

Figure 38:
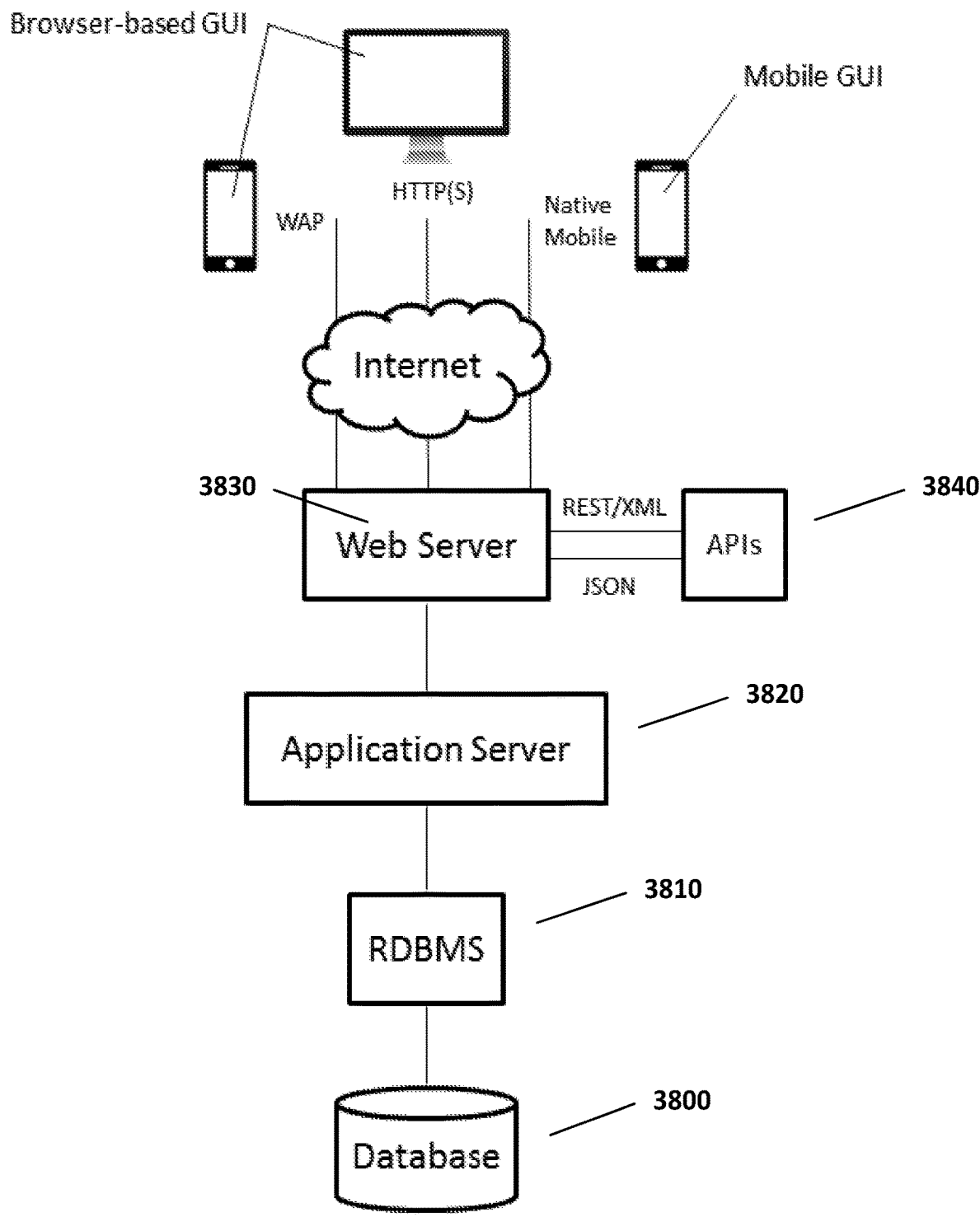
FIG. 38 shows a non-limiting schematic diagram of a web/mobile application provision system; in this case, a system providing browser-based and/or native mobile user interfaces.

Referring to FIG. 38, in a particular embodiment, an application provision system comprises one or more databases 3800 accessed by a relational database management system (RDBMS) 3810. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 3820 (such as Java servers, .NET servers, PHP servers, and the like) and one or more web servers 3830 (such as Apache, IIS, GWS and the like). The web server(s) optionally expose one or more web services via app application programming interfaces (APIs) 3840. Via a network, such as the Internet, the system provides browser-based and/or mobile native user interfaces.

Figure 39:
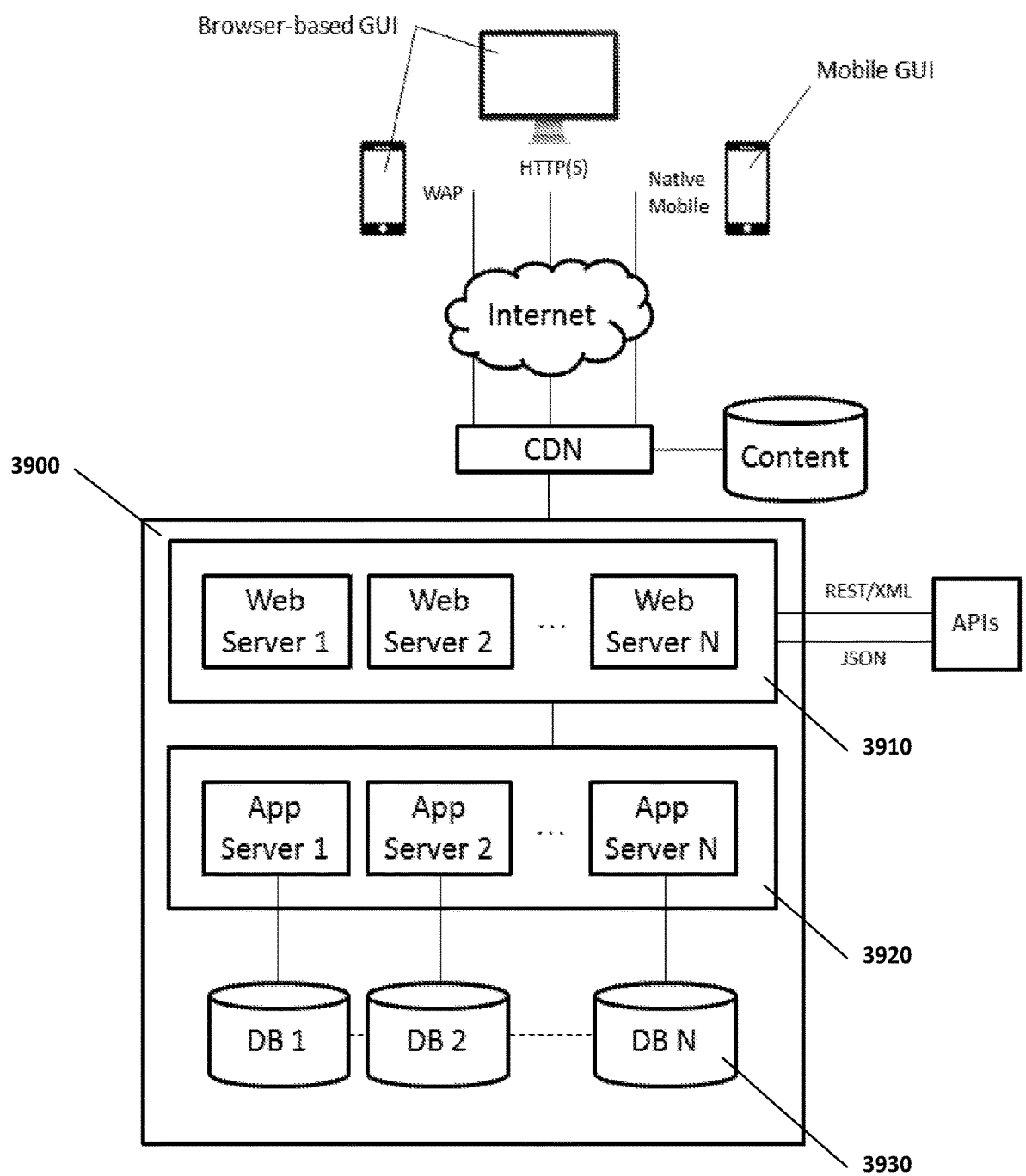
FIG. 39 shows a non-limiting schematic diagram of a cloud-based web/mobile application provision system; in this case, a system comprising an elastically load balanced, auto-scaling web server and application server resources as well synchronously replicated databases.

Referring to FIG. 39, in a particular embodiment, an application provision system alternatively has a distributed, cloud-based architecture 3900 and comprises elastically load balanced, auto-scaling web server resources 3910 and application server resources 3920 as well synchronously replicated databases 3930.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of released items, generative assessment items, patterns, set of rules for encoding responses, etc. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, the term "ASCII" refers to the American Standard Code for Information Interchange, which is a character encoding standard for electronic communication that represent text in computers, telecommunications equipment, and other devices.

EXAMPLES

The following illustrative examples are representative of embodiments of the software applications, systems, and methods described herein and are not meant to be limiting in any way.

Example 1

In addition to developing the generative assessment items from released items and checking against the TEKS, the items also address the more thematic, cross-grade, emphases found in the mathematics blueprints (i.e. the Reporting Categories). The development of core ideas can be investigated and characterized by the repeated use of generative assessment items including some items that 'evolve' over a number of grades by swapping in specific alternative responses while retaining others, as in FIGS. 3, 8, 13, 18, 23, and 29. The across-grade-level use of some items, combined with the increased information associated with the items allow for a more robust and detailed account of the development of student abilities in ways that fit with the thematic emphases of the mathematics blueprints. The repeated items have been developed or selected for their ability to assess both in-grade and across-grade depth of understanding.

Generative assessment items for grade 3 are shown in FIGS. 3-7. Generative assessment items for grade 4 are shown in FIGS. 8-12. Generative assessment items for grade 5 are shown in FIGS. 13-17. Generative assessment items for grade 6 are shown in FIGS. 18-22. Generative assessment items for grade 7 are shown in FIGS. 23-28. Generative assessment items for grade 8 are shown in FIGS. 29-36.

Example 2

Third grade student Sam is looking at an exam providing a non-dichotomous generative assessment item in the form of Multiple Choice Question No. 1. Question No. 1, which is displayed on a computer screen graphical user interface, asks "What is the same as ½?" Question No. 1 further offers six possible options: A being ½; B being ⅜; C being 100/200; D being 2/1; E being ¼; and F being 0.01/0.02. After reviewing the question, Sam selects with his mouse A, B, C, and D while leaving E and F unselected.

Instructor Ivan uses a traditional system that detects that Sam selected A, B, C, and D. The traditional system compares Sam's select to the correct combination: A, B, C, and F. Because Sam's selection is not a perfect match to the correct answer, Sam's response to Question No. 1 is scored as a "0" and Sam's original response of A, B, C, and D is discarded, forever lost. Only the scored "0" to Question No. 1 is saved.

Alternatively, Instructor Ivan utilizes an embodiment of the claimed non-dichotomous answer processing application. This application detects that Sam selected A, B, C, and D and E and F were not selected. The application continues to convert every one of Sam's selection in Question No. 1 as a "1" and a non-selection as a "0," and concatenates each converted binary to turn Sam's response into "111100." Sam's concatenated response "111100" is saved to later be processed and holds tremendous information density—recording both of Sam's specific selection and non-selection (among a possibility of 64 states) without any information loss. Further, the binary format of Sam's response is compact and provided in a manner that requires only 6 bits to store in contrast to the 24 bits that would have been required to store Sam's A,B,C,D (not including the commas, which would have needed even more bits). This smaller data package that results from the claimed non-dichotomous answer processing application allows the Instructor Ivan's computer to process Sam's response to Question No. 1 more efficiently and effectively than a traditional system.

Example 3

Student Sarah is also taking the same exam as student Sam. In response to Question No. 1, Sarah selects A, B, and C while leaving D, E, and F unselected.

Instructor Ivan wants to not only understand student Sarah's response to Question No. 1, but create a histogram that compares Sarah's response to Question No. 1 with Sam's response to Question No. 1. At first, Instructor Ivan uses the traditional system. But Instructor Ivan runs into a couple of problems. First, the traditional system automatically discarded Sarah's original response of A, B, and C after scoring Sarah's response as a "0." Moreover, when Instructor Ivan tried to concatenate Sam and Sarah's responses together, the result came out to "A,B,C,DA,B,C." The comma placements made computer processing difficult and ambiguous. Moreover, the combined responses required 42 bits for storage (not including the bits to store the commas, which would have required taking up even more data storage).

Instead, Instructor Ivan utilizes another embodiment of the claimed non-dichotomous answer processing application. This application detects that Sarah selected A, B, and C and D, E, and F were not selected. The application continues to convert every one of Sarah's selection to Question No. 1 into a binary format and concatenates them to form "111000." Next, the application further concatenates Sam's concatenated binary response and Sarah's concatenated binary response as "111100111000." This concatenation response across multiple students not only takes up less data storage than the output of the traditional system counterpart, but also provides for more predictable processing.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

What is claimed is:

1. A non-transitory computer-readable storage media encoded with a computer program including instructions executable by a processor to create a non-dichotomous answer processing application for e-learning, the application comprising:

a) a prompt module, displaying a non-dichotomous generative assessment item comprising a series of two or more answer choices;

b) a recording module, receiving a student answer to each answer choice in the series, wherein each student answer comprises an answer selection or an answer non-selection;

c) a storage module, storing the received student answer to each answer choice in the series in a binary format, wherein any answer selection is stored as a first binary number and any answer non-selection is stored as a second binary number; and d) a concatenation module, concatenating every binarily stored student answer in the series to form a concatenated answer in a binary format providing a computationally efficient, unambiguous representation of every binarily stored student answer, wherein the concatenated answer does not comprise a delimiter.

2. The media of claim 1, wherein:

a) the prompt module further displays two or more non-dichotomous generative assessment items;

b) the recording module further receives the student answer to each answer choice for each of the two or more non-dichotomous generative assessment items;

c) the storage module, further stores the received student answer to each answer choice in the series for each of the two or more non-dichotomous generative assessment items, in the binary format; and d) the concatenation module, further concatenating every concatenated answer for each of the two or more non-dichotomous generative assessment items to form a multiple item concatenated answer.

3. The media of claim 2, wherein a size of the multiple item concatenated answer is equal to AC*Q bits, and wherein AC equals a number of answer choices, and wherein Q equals a number of non-dichotomous generative assessment items.

4. The media of claim 1, wherein:

a) the prompt module further displays the non-dichotomous generative assessment item to two or more students;

b) the recording module further receives the student answer to each answer choice in the series for each of the two or more students;

c) the storage module, further stores the received student answer to each answer choice for each of the two or more students, in a binary format; and d) the concatenation module, further concatenating every concatenated answer for each of the two or more students to form a multiple student concatenated answer.

5. The media of claim 4, wherein a size of the multiple student concatenated answer is equal to AC*S bits, and wherein AC equals a number of answer choices, and wherein S equals a number of students.

6. The media of claim 1, wherein a size of the concatenated answer is equal to AC bits, wherein AC equals the number of answer choices.

7. The media of claim 1, wherein the application further comprises a blockchain module storing the concatenated answer in an immutable data storage.

8. The media of claim 1, wherein the application further comprises a histogram module forming a histogram from the concatenated answer.

9. The media of claim 1, wherein the first binary number is 1 and the second binary number is 0.

10. The media of claim 1, wherein each of the two or more answer choices are not independent from each other.

11. The media of claim 1, wherein the delimiter comprises a comma, a semicolon, a colon, a tab, a bracket, a parenthesis, a hashtag, a quotation mark, an asterisk, or any combination thereof.

12. The media of claim 1, wherein the delimiter is not located between the two or more answer choices.

13. A computer-implemented method for an e-learning non-dichotomous answer processing, the method comprising:
   a) displaying, by the computer, a non-dichotomous generative assessment item comprising a series of two or more answer choices;
   b) receiving, by the computer, a student answer to each answer choice in the series, wherein each student answer comprises an answer selection or an answer non-selection;
   c) storing, by the computer, the received student answer to each answer choice in the series in a binary format, wherein any answer selection is stored as a first binary number and any answer non-selection is stored as a second binary number; and
   d) concatenating, by the computer, every binarily stored student answer in the series to form a concatenated answer in a binary format providing a computationally efficient, unambiguous representation of every binarily stored student answer, wherein the concatenated answer does not comprise a delimiter.

14. The method of claim 13, wherein a size of the concatenated answer is equal to AC bits, wherein AC equals the number of answer choices.

15. The method of claim 13, further comprising storing, by a blockchain module, the concatenated answer in an immutable data storage.

16. The method of claim 13, further comprising forming, by a histogram module, a histogram from the concatenated answer.

17. The method of claim 13, wherein the first binary number is 1 and the second binary number is 0.

18. The method of claim 13, wherein the delimiter comprises a comma, a semicolon, a colon, a tab, a bracket, a parenthesis, a hashtag, a quotation mark, an asterisk, or any combination thereof.

19. The method of claim 13, wherein the delimiter is not located between the two or more answer choices.

20. A computer-implemented system comprising: a digital processing device comprising: at least one processor, an operating system configured to perform executable instructions, a memory, and a computer program including instructions executable by the digital processing device to create a non-dichotomous answer processing application for e-learning, the application comprising:
   a) a prompt module, displaying a non-dichotomous generative assessment item comprising a series of two or more answer choices;
   b) a recording module, receiving a student answer to each answer choice in the series, wherein each student answer comprises an answer selection or an answer non-selection;
   c) a storage module, storing the received student answer to each answer choice in the series in a binary format, wherein any answer selection is stored as a first binary number and any answer non-selection is stored as a second binary number; and
   d) a concatenation module, concatenating every binarily stored student answer in the series to form a concatenated answer in a binary format providing a computationally efficient, unambiguous representation of every binarily stored student answer, wherein the concatenated answer does not comprise a delimiter.

* * * * *